United States Patent [19]

Bjornsson

[11] 4,030,072
[45] June 14, 1977

[54] COMPUTER SYSTEM OPERATION AND CONTROL
[75] Inventor: Eyjolf Steuart Bjornsson, Manhattan Beach, Calif.
[73] Assignee: Xerox Corporation, Stamford, Conn.
[22] Filed: Dec. 18, 1974
[21] Appl. No.: 534,045
[52] U.S. Cl. .......................................... 340/172.5
[51] Int. Cl.² ...................................... G06F 11/04
[58] Field of Search .................. 340/172.5; 445/1
[56] References Cited
UNITED STATES PATENTS

| | | | |
|---|---|---|---|
| 3,421,150 | 1/1969 | Quosig et al. | 340/172.5 |
| 3,623,011 | 6/1969 | Brynard, Jr. et al. | 340/172.5 |
| 3,643,227 | 2/1972 | Smith et al. | 340/172.5 |
| 3,648,252 | 3/1972 | Thron et al. | 340/172.5 |
| 3,763,474 | 10/1973 | Freman et al. | 340/172.5 |
| 3,771,131 | 11/1973 | Ling | 340/172.5 |
| 3,806,878 | 4/1974 | Edstrom | 340/172.5 |
| 3,825,901 | 6/1974 | Golnek, Sr. | 340/172.5 |

Primary Examiner—Harvey E. Springborn
Attorney, Agent, or Firm—James J. Ralabate; Michael J. Colitz, Jr.; Franklyn C. Weiss

[57] ABSTRACT

A data processing system includes a control processor in communication with the various devices comprising the data processing system. Communication between the control processor and the data processing system devices occurs on a separate maintenance and diagnostic bus. The control processor initiates diagnostics stored within several of the data processing system devices. The self-diagnosing devices provide an indication to the control processor of successful completion of the diagnostic stored therein. The device being diagnosed and the control processor operate asynchronously of each other and utilize a register bit to indicate successful completion of the diagnostic test.

8 Claims, 15 Drawing Figures

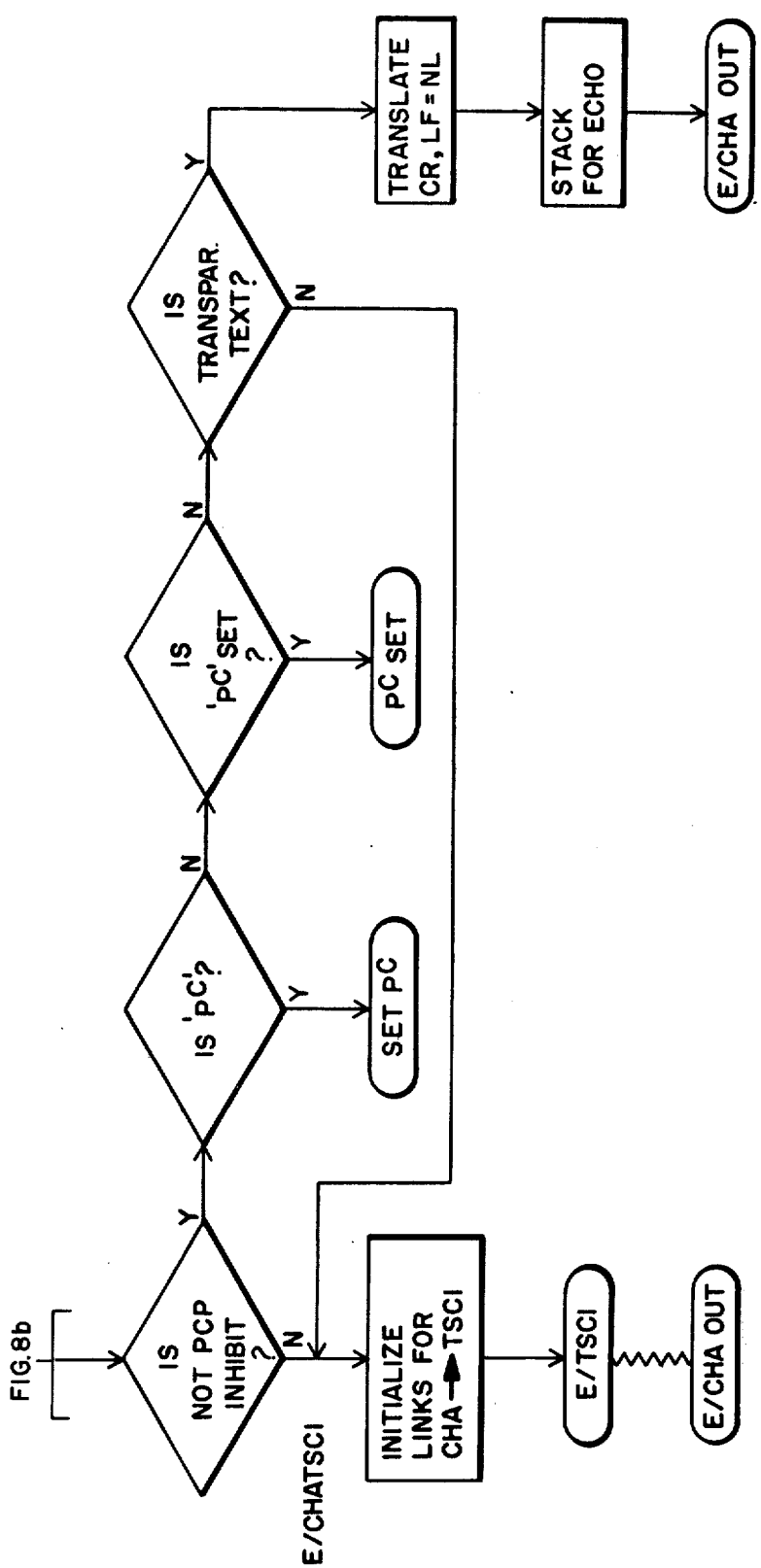

COMPUTER SYSTEM OPERATION AND CONTROL

TABLE OF CONTENTS

Background of the Invention
  Field of the Invention
  Description of the Prior Art
Summary of the Invention
Brief Description of the Drawings
Description of a Preferred Embodiment
  PIC Module
  Basic Processor
  General Registers
  Processor Control Word
  Address Compare Word
SCI Operation
  Channel B Input
  TSC Communications
  Channel A Input
  Control Modes
  Maintenance Mode Functions
  Channel A Output
  P-Mode Sequencing
  TSC Data Output
  Channel B Output
  SCP Display Handler
  Test Sequences
  Address Match
  Address Alarm
  Halt Message

BACKGROUND OF THE INVENTION

1. Field of the Invention

This invention relates to electronic data processing systems and more particularly to the remote control and diagnosis of computer systems by means of an external control subsystem.

2. Description of the Prior Art

A computer system for commerical data processing, time-sharing, and/or real-time computing requires a means of communication for its local operator ("operator", as used herein, need not be restricted to human operators but may include other computers or systems for controlling the system referenced) as part of the process of starting, stopping, loading and diagnosing the system. Traditionally, the means of communication has been two-fold, a panel of lamps and switches for manually interacting with the system hardware and a typewriter-like device or console which has traditionally been constrained to interact only with the system software, usually the operating sytem software. In "remote trouble-shooting", a similar means is required to allow remote operator control capable of operating over a telecommunications channel and it is necessary to combine in this means of communication, both control of software related events and hardware related events. Remote trouble shooting is a useful tool, practically and economically as it allows highly skilled maintenance personnel to attend large numbers of computer systems over wide geographic areas.

The use of a telecommunications channel for control of hardware and software imposes constraints on the nature of the control operations which are possible and the manner in which they are implemented. A telecommunications device, for example, is intrinsically serial in nature. Therefore, the control protocol must be organized such as to be meaningful in terms of the succession of serial events whether those consist of a single input character or a string of input characters. Characters, in this sense, may mean a binary code generated by a remote telecommunications device.

The serial nature of the communications introduces a sensitivity to error because of the characteristics of typical communications paths, and therefore the control mechanism or control protocol must be organized so as to have limited sensitivity to the kinds of error which normally occur in a communications environment. These errors amount to alteration of bits in individual characters, interruption of communications because of noise on the lines, and other such distortions of the information. A consequence of the organization of a computer system for remote control and diagnosis is the need for a central point of control on the system. That point of control is central from the standpoint of the local operator, and the remote point of control must correspond to the point of control of the local operator so that transactions may be monitored, entered or controlled from a remote point and so that control of the computer both in a hardware and a software sense may be had over a single communications path.

It is desirable to have the capability of single point hardware and software control over a communications channel in order to provide maintenance to the computer system in both the case of unanticipated system failures and for preventative or diagnostic purposes where no known failure exists but it is desired to examine the state of the system to see if there are indications of potential failures. In the case where the system itself has failed, an inoperative system cannot control itself and the objective of diagnosing the failure in the machine in order to plan the appropriate maintenance action is defeated. If the system is partially functioning, fault conditions in the system itself may be such as to prevent the use of a control mechanism to diagnose the nature of the fault. Additionally, diagnosis of a failed computer system may be extremely difficult if the existing fault condition requires interactions at a rate faster than is possible over a standard telecommunications interface.

In order to overcome the problems of control and diagnosis of computer systems as described above, the instant invention provides a command and control processor which is able to exercise control of the essential system without being controlled, itself, by the system. The command and control processor will have in it the capability to communicate over a telecommunications path and a capability of receiving, storing, and translating commands from a remote operator into command sequences related to the detailed hardware of the machine. The internal control structure of the system is likewise altered such that the traditional panel of lamps and switches is no longer necessary to the control of the system, creating an economic saving. The lack of physical constraints of lamps and switches also allows the expansion of the number of control points without economic and physical constraints. Information may further be output from the system in larger quantities and greater variety than would be economically feasible through lamp displays, since the potential for data output over a telecommunications path to a telecommunications device is virtually unlimited in quantity and variety of information which can be transferred.

The introduction of a command and control processor in the system also allows the performance of sequences of operations which would not be manually feasible either through the panel of lamps and switches or over a telecommunications panel if it is assumed that the command and control processor operates at electronic speed and is interfaced to the system in such a way that it can control internal conditions at electronic speeds.

SUMMARY OF THE INVENTION

The foregoing features of the instant invention are accomplished by a control processor which addresses the data processing system devices on a specialized bus. An initiation signal, provided by the control processor to the addressed device, triggers operation of a diagnostic test stored within the device. Upon determining the existence of a device having an internal diagnostic at the address generated by the control processor, the processor idles a predetermined time and awaits indication of a successful completion of the diagnostic test. On indication of successful completion of the diagnostic, the control processor continues in its operation, and may generate a next address for testing a next device in the data processing system. A specified bit of a single clock status register is utilized to indicate successful completion of the diagnostic. Setting the bit to a first condition upon initiation of the diagnostic is indicative to the controller of the existence of a self-diagnosing device at a particular address generated by the controller. The controller, after idling a predetermined length of time, then returns to check the specified bit to determine if it has been set to a second condition, thus obtaining indication of successful completion of the diagnostic.

DESCRIPTION OF A PREFERRED EMBODIMENT

Figure 1:
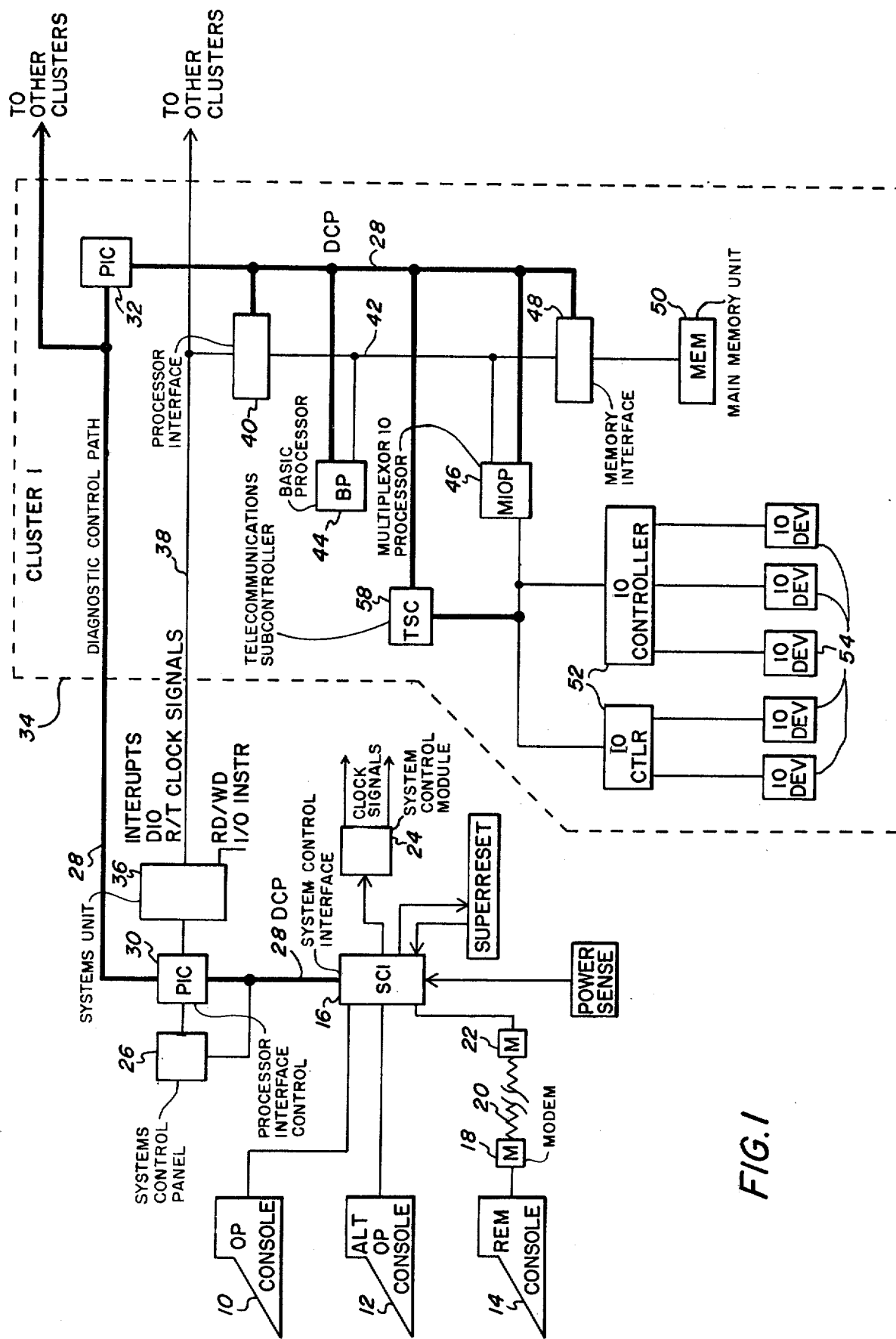
FIG. 1 is a block diagram of a computer system incorporating the instant invention.

FIG. 1 is an overall block diagram of a system incorporating the features of the instant invention. In particular, three Operator Consoles are shown through which information may be entered into or received from the computer system. An Operator's Console 10 and an Alternate Operator's Console 12 are connected directly to a System Control Interface 16 which functions as a command and control processor to control the operation of the overall system. A Remote Console 14 is shown connected through a modem 18 across a telephone line 20 through a further modem 22 and ultimately connected also to the SCI 16.

The Operator's Console 10 (Channel A) may be any ASCII-Code communications device capable of sending and receiving asynchronous data over a standard interface at various standard speeds. In most systems configurations, the operator's console would be cabled directly to the SCI module below, without intervening hardware. If desired, however, the operator's console may be interfaced to the system via a communications modem (1 each at the system site and the console site), over a telephone line or other long distance path.

The operator's console alternate 12 has interface characteristics and control identical to those of the primary Operator's Control 10. Both channels receive identical data, but only one may be selected to originate input.

The Remote Console 14 has interface and data characteristics identical to those of the Operator's Console 10. Normally, however, the Remote Console (Channel B) will always be interfaced to a data communications modem as described above. Channel B may be used in two different ways depending upon the type of maintenance activity in progress. During "on line troubleshooting", that is, when operating software is performing additional non-maintenance work in the system, the Remote Console is operated in a "decoupled" mode. In this state, the Remote Console acts as an independent communications channel into the system. No interaction occurs between Operator's Console 10 and Remote Console 14 except at the system software level. Remote Console 14 appears to the software as an independent I/O controller resembling the console controller but, of course, residing at a different address. During "off line trouble-shooting", when the entire system is assumed to be under the descretionary control of the remote trouble-shooter or local maintenance personnel, the Remote Console may be operated in a "coupled" mode. In this mode, the remote trouble-shooter is logically interfaced to Channel A, that is, the channel of the Operator's Console 10, and the remote terminal behaves in the same manner as the Operator's Console 10. The Remote Console 14 may be used to enter data through a software channel normally reserved for the Operator's Console 10. If the facility is enabled the Remote Console 14 in coupled mode has access to all P-Mode and Z-Mode DCP controls (to be discussed later) just as does the local systems operator.

Connected to the SCI is a System Control Module 24 which has several functions within the computer system but for purposes of discussion of the instant invention, it is necessary to note merely that the SCM contains the apparatus for generating the system internal clock signals.

Also associated with the SCI 16 is an SCP or System Control Panel 26. The System Control Panel 26 consists of a series of lights and switches which may perform a function similar to that of the Operator's Console, that is, a means for entering data or control information (the switches) into the system and a means for monitoring the condition of the data or control information within the system (the lamps). Connecting the SCI to the SCP 26 is a DCP bus 28 which is additionally connected to a Processor Interface Control module 30, the structure and operation of which will be described in greater detail later in the specification. The DCP bus 28 continues through the PIC module 30 to a second PIC module 32 which is connected to various elements of a processor cluster which is shown within the dashed line 34. It is understood that, while only one processor cluster is shown in FIG. 1, additional processor clusters may be provided to increase the size and performance of the computer system described. The existance of the additional clusters is shown merely by extensions of various bus lines with indications of destinations in other processor clusters.

The PIC module 30 is connected to a Systems Unit 36 which contains shared resources of the computer system. These shared resources contained within the SU device 36 may be, for example, controllers for the various processors, interrupt structures, real-time clock structures and the like, all of which may be common to more than one processor cluster and thus may be connected to various devices within the cluster by control and data lines which are not shown in FIG. 1 for purposes of clarity of the drawing. It is well understood by those skilled in the art, however, how such system-shared resources are distributed throughout the computing system. The text Microprogramming Principles and Practices, by Husson (1970, Prentice Hall) gives several examples of microprogrammable computers which use shared resources. For example, see sharing of CPU clock and power supplies, as well as data paths, by the multiplexor channel of IBM system/360, Mod 50, as described at Sec. 8.15 of Husson. Simultaneous access of a memory unit by an I/O unit and a CPU is described at Sec. 10.4 for the Honeywell H4200.

Connected to the SU module 36 is a Processor Bus 38 to which each processor cluster in the overall system is connected through the mechanism of a processor interface 40 for each processor cluster. Associated with each processor interface 40 is an Internal Bus 42 to which are connected a Basic Process or Arithmetic and Logic Unit 44, a Multiplexer IO processor 46, and a Memory Interface 48. Connected to the Memory Interface 48 is a Main Memory Unit 50. Associated with the Multiplexer IO Processor 46 are several Input/Output Controllers 52 which have associated with them a plurality of Input/Output Devices 54. Again, it is well understood within the data processing art how the Basic Processor 44, or ALU unit, the Input/Output Processor 46 and the Memory Interface and Memory Unit 48 and 50 are caused to interact to provide data processing capabilities. The text noted above gives examples of such interactions.

FIGS. 1.1 and 6.1 of the text are such illustrations. Associated further the the PIC module 32 is another extension of the DCP bus 28 which is terminated at the Processor Interface 40, the basic Processor 44, the Multiplexer I/O Processor 46 and the Memory Interface 48. Additionally, associated with the DCP bus 28 is a telecommunications subcontroller (TSC) module 58 which is the interface between the external control system and the input/output system. That is, information to and from the input/output system of the processor is carried through the TSC module over the DCP bus 28 with the aid of PIC module 32 ultimately reaching the user interfaces through the SCI 16.

Figure 2:
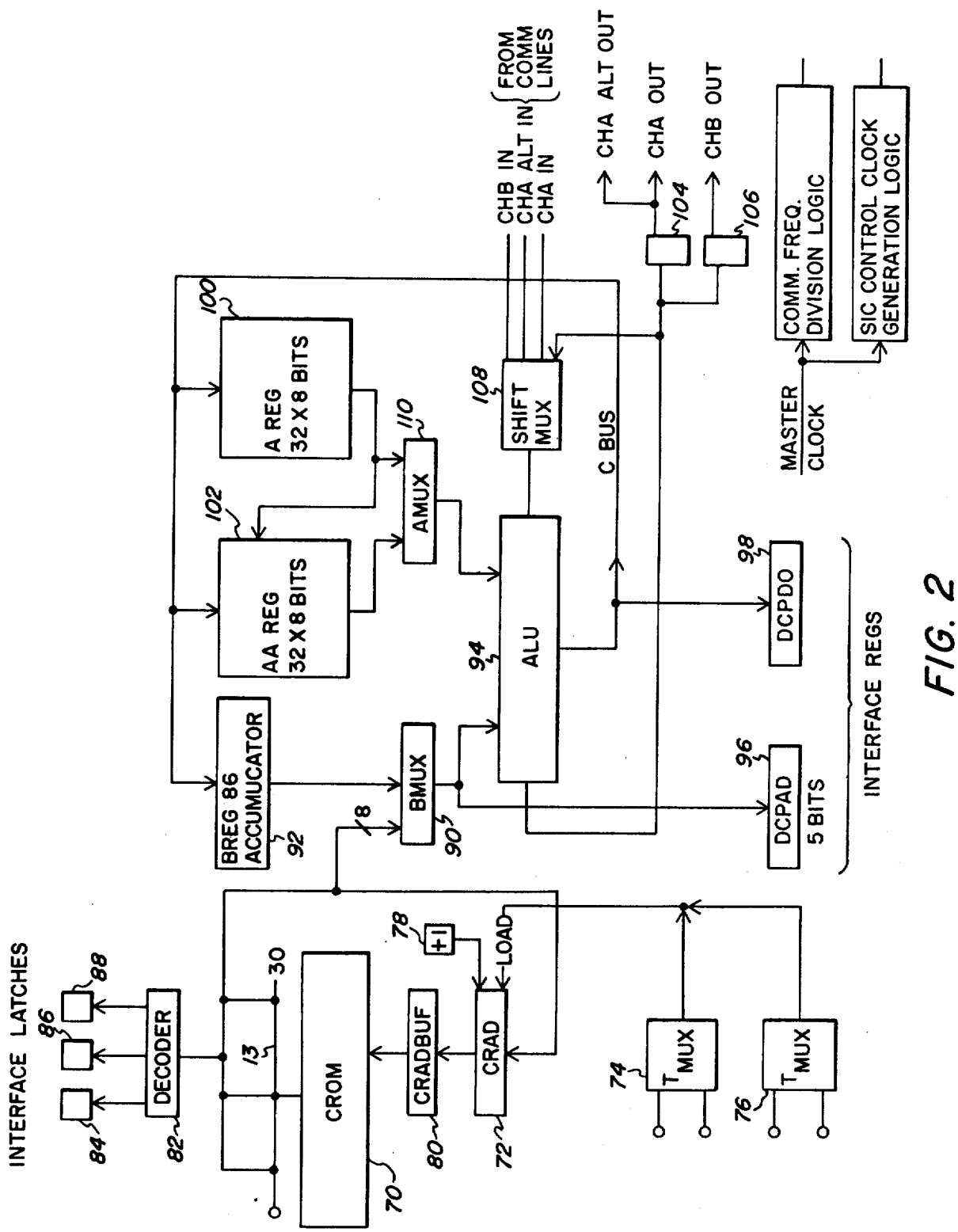
FIG. 2 is a block diagram of the SCI module according to the invention.

FIG. 2 is an overall block diagram of the System Control Interface or SCI 16 from FIG. 1. The SCI module provides all control for external control subsystem functions. The SCI is a fixed-program, micro-controlled processor which operates independently of all other system elements to the greatest extent possible. The SCI is organized so that it will continue to operate and provide a mechanism of control under all failure conditions other than loss of system power or master clock signal. The SCI has four interfaces of primary importance as shown in FIG. 1:

1. EIA-standard communications interface for the operator's console 10 (to be described later as Channel A).

2. A switch-selectable alternate EIA interface for the alternate operator's console 12 (Channel A Alt.).

3. An EIA interface for the remote console 14 (further described as Channel B).

4. A 14-wire interface DCP bus 28 through which the SCI communicates with all other system elements.

As shown in FIG. 2, the fixed-program of the SCI is stored in a control read only memory 70 which may be of conventional design and capable of storing control words having lengths of 20 bits. The read only memory 70 is addressed by means of an address register 72 which derives its inputs from one of a pair of multiplexers 74, 76 or from selected output lines of the read only memory 70 which may contain the address of the next successive control word to be operated upon. Also, shown associated with the address register is an incrementer 78 which, again, may be of conventional design. The function of the incrementer 78 is merely to add one to the contents of the address register 72 for serial progression through the contents of the read only memory 70. The address is buffered by a control read only memory address buffer 80. The output of the read only memory 70 is applied over output lines as shown to a decoder 82, the output of the decoder being operable to set or reset one or more of a plurality of interface latches 84, 86, 88. It is understood that there may be more interface latches than the three depicted in FIG. 2 but the number shown is limited for clarity of description of the device. The output of the read only memory 70 may be applied to a B-multiplexer 90 which has an additional or alternate input from the B register block 92 which is an accumulater. The B-multiplexer output may be applied alternately to an arithmethic and logic unit 94 or an interface register DCPAD 96, the function of which will be described later. The output of the ALU 94 may be alternately applied to a second interface register DCPDO 98, or as an input to an A register 100, an AA register 102 or the B register 92 as previously noted.

The output of the ALU 94 which may be applied to the A register, AA register or B register is by means of a bus structure which is referred to as the C bus. The ALU 94 may be operated in a serial or parallel manner, that is, data may be shifted into or out of the ALU or applied to and extracted from the ALU in parallel. The serial output of the ALU 94 may be applied to output registers 104 and 106 where are the Channel A output and Channel B output registers, respectively. The Channel A alternate output is derived directly from the Channel A output from the register 104. The serial ALU output may alternatively be applied to a shaft multiplexer 108 which derives additional input from communication lines representing Channel A input, Channel A alternate input or Channel B input.

The A register may be a 32 by 8 bit register with an 8 bit parallel input and output. The A register output may be applied as a input to the AA register or alternately as an input to the A multiplexer 110. The AA register is also a 32 by 8 bit register block, the ouput of which may also be applied to the A multiplexer 110. The A multiplexer performs the function of selecting the ouput from either the A register or the AA register for application to the ALU 94.

The operation of the SCI will be described in detail in a subsequent portion of this specification.

PIC MODULE

The SCI, as previously noted, communicates with all system elements other than the Operator's Console over the DCP bus. The DCP bus has various interfaces connected thereto for interfacing with the different system elements.

The PIC module is the interface between the SCI and a group of Single Clock Status Registers distributed among the elements of the system. The SCSRs are primarily diagnostic tools for use when the system is in a maintenance mode and is being single clocked or stepped through operation manually in order to isolate faults. SCSRs may be up to 32 bits in length (the length is not critical and may be any conveniently addressable length) and one SCSR may be dedicated to one particular module or distributed among several modules. A particular module may have more than one SCSR associated with it. Likewise, a single SCSR may serve multiple systems or multiple elements within a system.

Briefly, a Single Clock Status Register is an interface which allows the state of an element desired to be sensed to be so sensed and the status returned to the SCI and, ultimately, the Operator's Console for display.

An SCSR may monitor any point of circuit connection or interconnection, any node or storage means or single carrying line. Thus, the contents of a register or a bus may be sensed. The following is a brief description of the logic of pertinent parts of the PIC module as they relate to SCSR operation over the DCP bus. A more exhaustive treatment of the SCI operation, including SCSR operation, will be made later under the heading "SCI Operation".

Figure 3A:
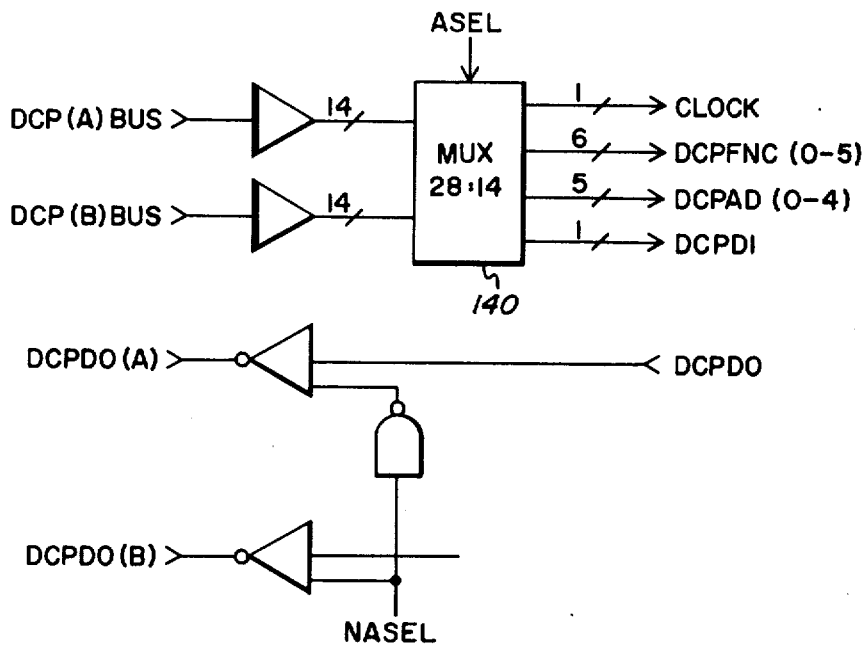
FIGS. 3a–3e is a block diagram of the PIC module.

FIGS. 3a through 3d are block diagrams of the logic of a typical PIC Module and its inputs, a pair of fourteen line busses, as well as its outputs which are busses of varying size going to Single Clock Status Registers and to the Basic Processor. FIG. 3a depicts the manner in which two alternative DCP busses (DCP(A) and DCP(B)) are selected through the means of an external control signal. These two busses may be functionally identical but independent, allowing dual access to the PIC control elements and the cluster logic through one of two alternative paths. The two alternate busses are multiplexed together by a 28:14 multiplexer 140 to form a single DCP bus internal to the PIC. Five of the DCP bus lines, DCPAD are connected to a comparison logic 142 in FIG. 3b which is activated by a function code on the DCPFNC lines to compare an input address with a stored address in the cluster. If these addresses compare, a latch 144 called CSEL is set when the function code 08 appears on the DCPFNC lines to cause cluster selection. If the CSEL latch is set and the function code 01 subsequently appears on the DCPFNC lines, the ESEL latch 146 will be set indicating that a Single Clock Status Register element is to be selected. At the same time, the contents of the DCPAD bus, lines 1-4, are stored in a Single Clock Status Register address Register 145. This address register connects to a four-bit to sixteen-state decoder 146a which generates one of sixteen element select signals that are distributed to individual Single Clock Status Registers. Also transmitted directly to the Single Clock Status Registers are the DCPAD address lines, the DCPDI data line and the DCPDO data line which is the path through which Single Clock Status Register data is output. If the ESEL latch has been set as described above, the signal line DCPDO:C which connects to all Single Clock Status Register outputs is enabled for transmission on the DCP bus. Signals from the DCPFNC lines are input to a pair of three-bit to eight-state decoders 147, 148. One of these decoders, 148, is continuously enabled so as to decode function codes in the range of eight to fifteen. The second of these decoders, 147, is enabled only when the CSEL signal is true, indicating cluster selection, decoding function codes 0 through 7. One of the coded DCPFNC signals, Function 09, is used to reset the cluster and element selection logic ESEL 146 to deactivate all PIC modules in the system at the end of a transaction.

Figure 3C:
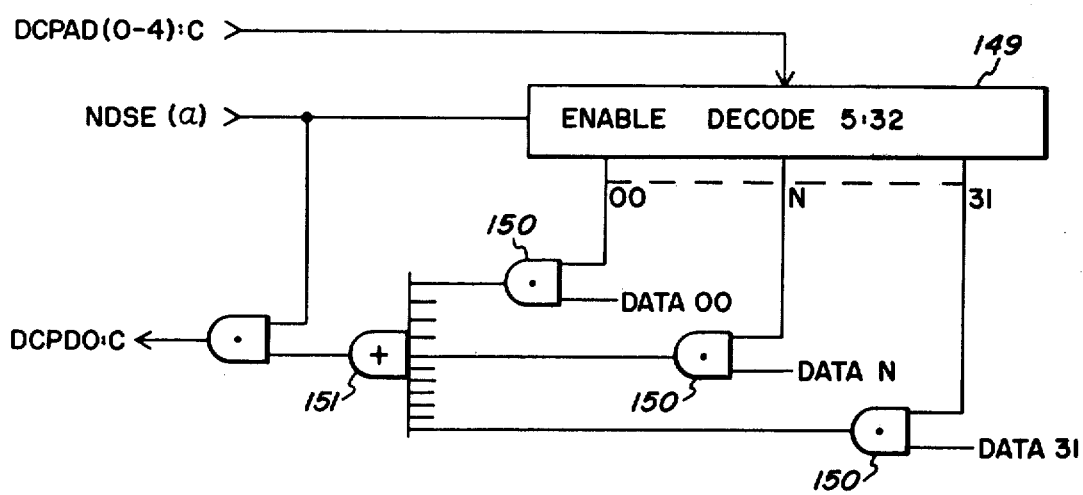
Figure 3B:
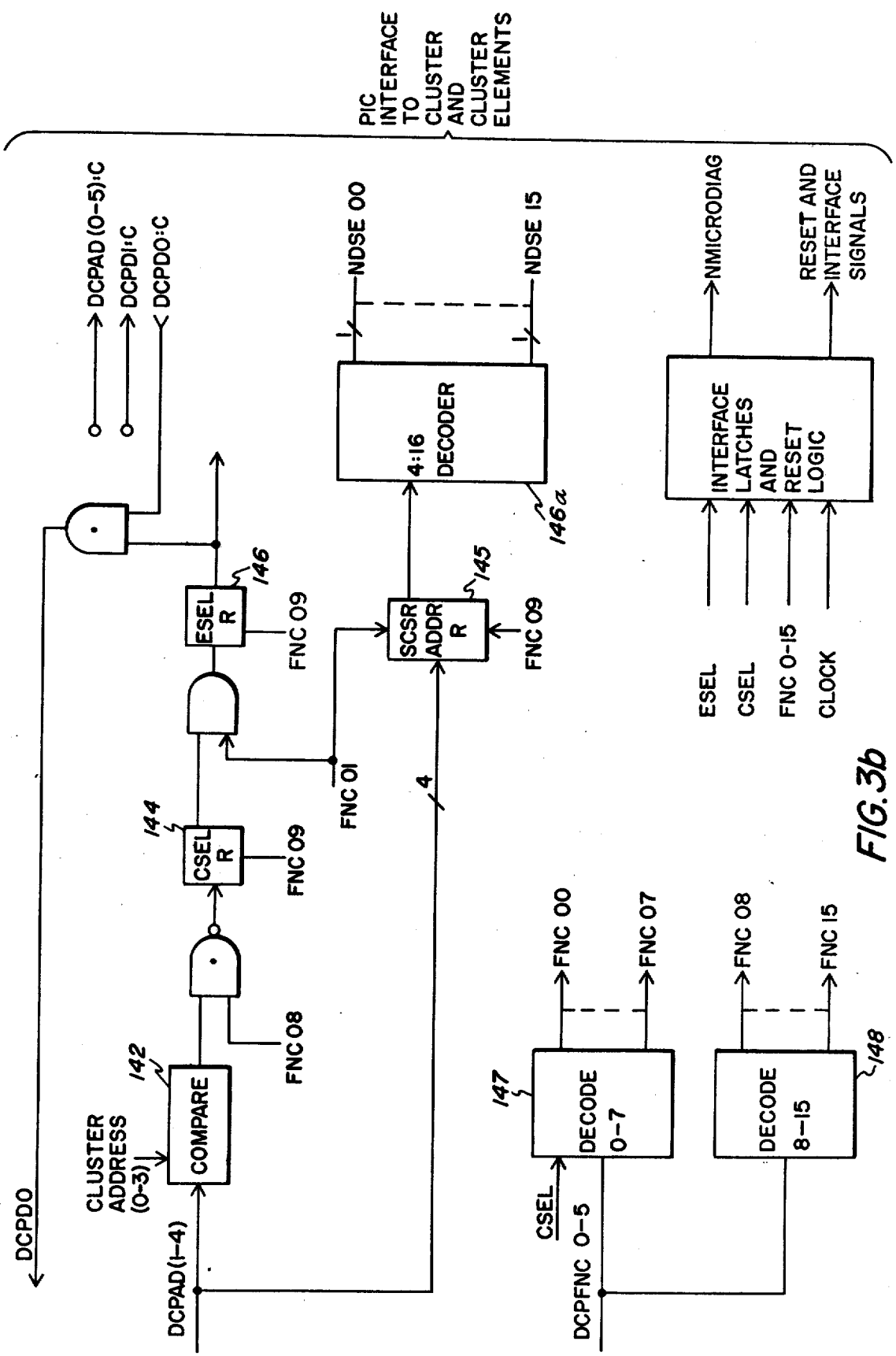

As shown in FIG. 3c, a typical Single Clock Status Register implementation consists of a decoder 149 connected to the DCPAD signal lines 0-4, which is enabled by the signal line NDSE, one of the sixteen possible NDSE signals generated by the PIC decoder 146a. The assignment of an NDSE signal to a specific SCSR can either be a fixed characteristic of the system logic or may be altered at the time of configuration. The address decoder 149 enables AND gates 150 which in turn enable passage of data information from the system element in which the SCSR resides to the DCPDO:C bus which in turn is interfaced to the DCPDO bus that eventually is transmitted to the SCI. The outputs of all SCSRs are ORed together at 151 within the cluster, and so the NDSE signal is used to enable a given one of those outputs for activity on the bus.

Referring again to FIG. 3b, the PIC includes reset and control logic operating by various combinations of function codes and function states which operate the CPU, Memory, I/O resets and other control signals in the cluster.

The PIC, since it carries the DCP bus is also involved in communications between the SCI and the Basic Processor. The Basic Processor will be described in more detail in a subsequent section.

The DCP bus-BP interface differs from the DCP-SCSR interface in several important respects. In the SCSR interface, control of the transaction never was required to pass from the SCI, as the SCSR contents were continually accessed and the SCI merely (through the PIC) addresed the individual bits of the SCSR under interrogation.

Communications with the Basic Processor, however, is substantially more complex due to the nature of the control information exchanged between the BP and SCI. Since the primary philosophy of the SCI is that of maintaining total autonomy, the BP, even through failed, can not be allowed to prevent the SCI from completing its own algorithm. To this end a protocol has been established whereby a register pair is used to pass communications, which register operation can not interfere with SCI operations.

Figure 3D:
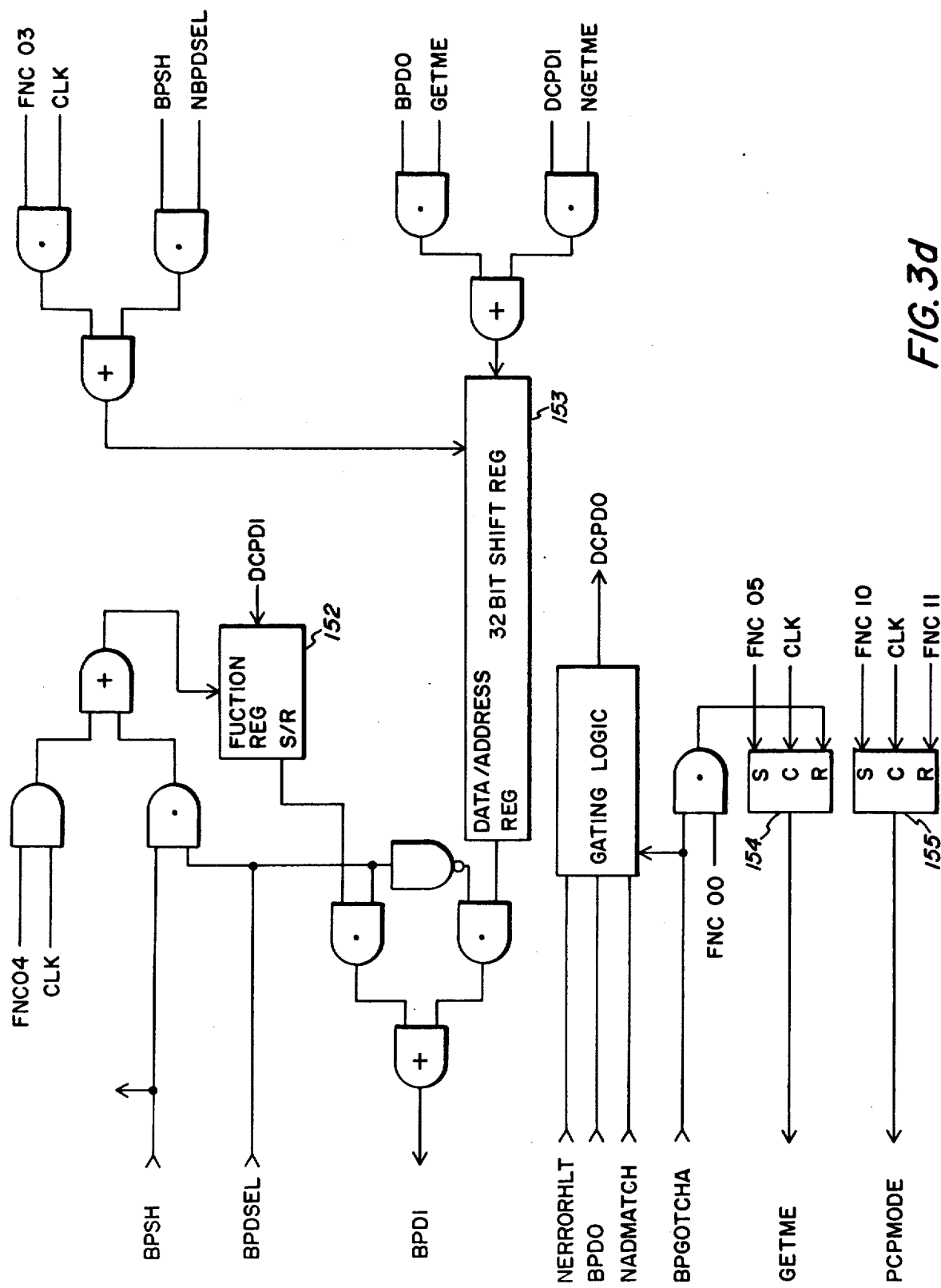

In FIG. 3d, the interface between the DCP bus and the Basic Processor differs from that to the SCSRs. This interface consists of two shift registers, one is four bits long (function register 152) which transfers function codes from the SCI to the Basic Processor. The other, 153, is thirty-two bits long, transfers data and address information from the SCI into the Basic Processor and transfers data and address information from the Basic Processor back to the SCI. Because the SCI and Basic Processor are asynchronous with respect to each other, logical means are provided for transferring the electronic control of these shifting registers from the SCI to the Basic Processor and back to the SCI. This control is implemented by means of function codes sent from the SCI and interface signals received from the Basic Processor. Using function code 04 the SCI can shift individual bits of data over the DCPDI path into a function register 152. Likewwise, using function code 03, the SCI can shift individual bits into the thirty-two bit data-/address register 153. Control of these registers is transferred from the SCI to the Basic Processor by the setting of the GETME latch 154 through function code 05. When this signal is true, the Basic Processor interface signals BPSH and BPDSEL control which of the two shift registers is directed to input to the Basic Processor and controls the shifting of individual bits. Likewise, in this mode, ths signal BPDO provides an input to the 32 bit shift register from the BP when information is to be transferred to the SCI. The BPGOTCHA signal indicates the completion of a transaction and the desire to return control of the shift registers from the BP to the SCI. A means is provided through the use of function codes and other gating logic to detect the state of the BPGOTCHA, BPDO, NADMATCH, and NERRORHLT signals returned from the Basic Processor under the control of the SCI. The PCP Mode latch 155 signals to the BP the need to enter those special microcode routines which implement the algorithms of the PCP functions.

TSC-SCI INTERFACE

The SCI also interfaces with the TSC module over the DCP bus which, again, passes through the PIC module. The TSC is a telecommunications sub-controller through which the SCI and, hence, the operator can communicate with system software, similarly as is conventionally done in data processing systems. Similarly, that is, only in the sense that a telecommunications channel is used for such an interface. Again, the existence of a control processor, the SCI, allows expanded control even of these conventional operations, such as, for example remote operation and Transparent Test operation.

Figure 3E:
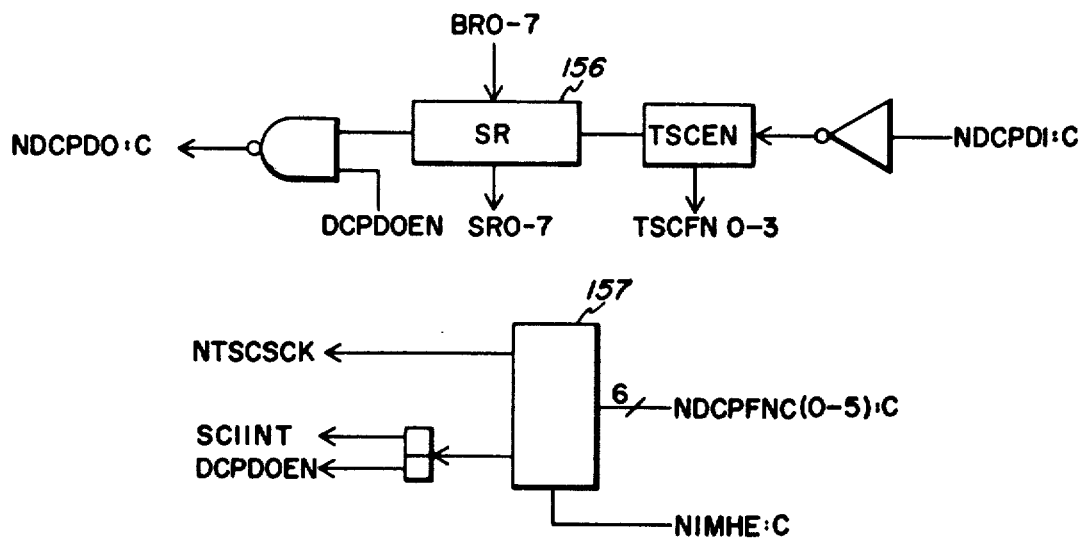

The interface between the SCI and the TSC consists of a 12-bit shift register 156 in FIG. 3e connected to the DCPDI and DCPDO lines available within the cluster. The TSC also contains a decoder 157 which senses function codes that generate the signal SCIINT (SCI Interrupt) which is an interrupt ot the TSC causing examination of the TSC interface registers and the signal DCPDOEN which enables the TSC to transmit information on the DCPDO bus. The Decoder 157 may be a Read Only Memory device, responsive to a plurality of input codes for generating a plurality of output functions. The standard clock signal is also brought in here. The protocol for a transaction of the DCP-TSC interface is that the SCI, for an input transaction, sends over 8 bits of data plus a 4-bit function code indicating the channel for which the data is intended and the fact that it is an input transaction. Then it sends the function code which generates SCIINT and disconnects, leaving the TSC to handle the data itself. Likewise, for an output transaction the SCI shifts in only 4 bits of data inciating channel and the need for an output transaction. The SCI then triggers the function code for SCIINT and waits for a period of time (approximately 9 microseconds). Following that time, it enables the DCPDO Enable line by means of a function code and shifts eight bits of data using yet another function code which generates the NTSCSCK signal. Finally, it generates yet another function code which disconnects the DCPDO Enable latch and removes the TSC from the DCP bus.

BASIC PROCESSOR

Figure 4:
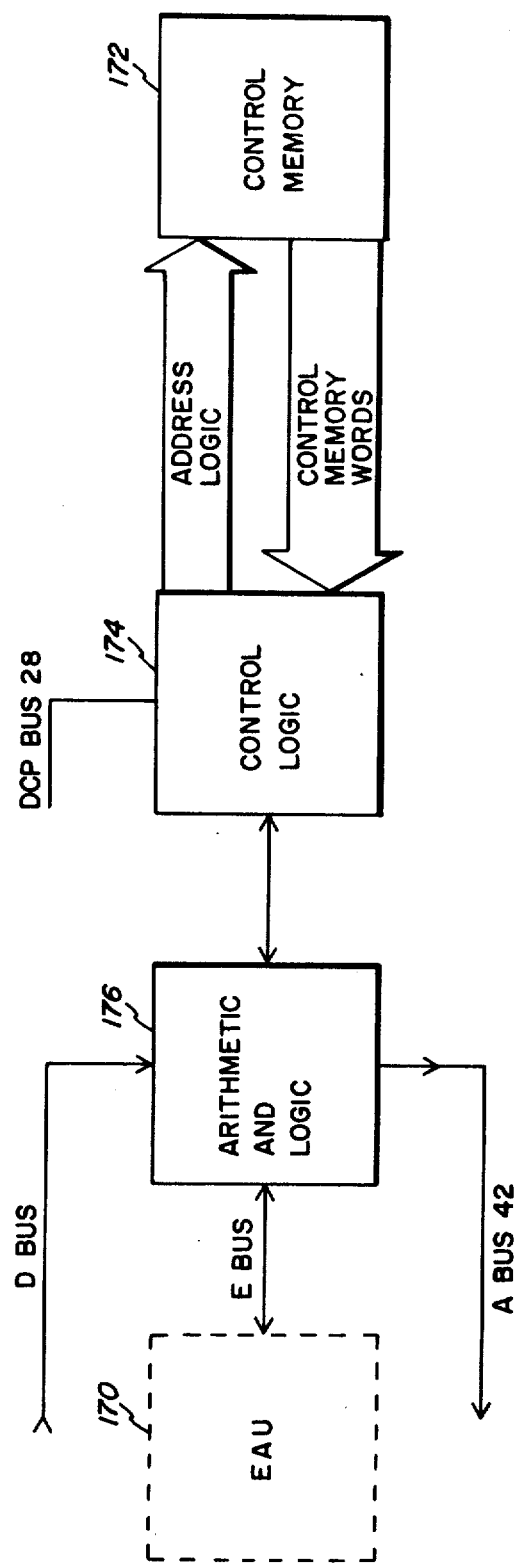
FIG. 4 is a block diagram of the Basic Processor module.

The Basic Processor comprises a fast memory and an arithmetic and control unit as functionally shown in the diagram of FIG. 4.

(Functionally associated with the Basic Processor but physically located elsewhere in the system are a memory map, memory access protection codes, and memory write protection codes. Since these are not directly related to the discussion of the instant invention, no further mention will be made of these components).

GENERAL REGISTERS

A fast memory consisting of ninety-six 32-bit registers is used within the Basic Processor. A group of 24 registers is referred to as a register block; thus a Basic Processor contains four register blocks. A 2-bit control field called a register block pointer in the program status words (PSWs) selects the register block currently available to a program. The register block pointer can be changed where the Basic Processor is in the master mode or the master-protected mode. Only the first sixty general registers of the register block may be used by program; the last eight are reserved.

Each of the first sixteen general registers in a register block is identified by a four bit code. Any of these sixteen registers can be used as a temporary data storage location or can contain control information such as data address, count, pointer, etc. General registers 1–7 can be used as index registers and registers 12–15 can be used as a decimal accumulator capable of containing a decimal number of thirty-one digits plus sign. Register 12–15 are used for decimal functions.

Since the operation of the Basic Processor, per se, does not form a part of the instant invention, it will not be discussed in detail. It is sufficient to note that certain registers which will be described later in more detail are accessible by means of the DCP bus to provide control information thereto, to set certain bits thereof and return information from the Basic Processor relating to status, microdiagnostic execution, and the like to the Operator's Console through the mechanism of the SCI. A general description follows.

The Basic Processor (BP) is the principal logical unit of the computer and is shown in block diagram form in FIG. 4. It contains circuits that control the execution of instructions, perform the arithmetic and logic functions, and maintain a rapid access memory containing special registers. An adjunct to, but not part of, the BP is the extended arithmetic unit (EAU) 170 for performing floating point arithmetic. Since the EAU forms no part of this invention, no further discussion will be included thereon.

The BP is a microprogrammed processor that operates under the control of the microprograms stored in its read-only-memory (ROM) 172. This ROM contains 4096 locations and each microinstruction is 80 bits in length. Control circuitry 174 for addressing the memory locations provides for microprogram conditioning, modification, and branching.

An instruction read from the main memory 50 by the BP determines the starting ROM address for the execution of that instruction. Microinstructions read from the ROM 172 determine the step-by-step processing of the BP.

The operation of the EAU 170 is initiated by the BP. The BP transfers to the EAU both instructions and data. Like the BP, the operation of the EAU is controlled by microinstructions read from a ROM (not shown) contained in the EAU. This ROM has 256 locations and each microinstruction is 64 bits in length. Control circuitry for addressing the memory locations provides for microprogram conditioning, modification, and branching.

When the EAU has finished a particular arithmetic operation (the data transferred back to the BP), the EAU returns to idle.

The BP communicates with the other units of the system over the Internal Bus 42. This bus connects the BP with the processor interface (PI) and the memory interface (MI). The PI connects the BP to other processors outside the cluster and the MI connects the BP with the memory units of the system.

The BP (with EAU) is composed of four major functional groups, as shown in FIG. 4. All data enters the BP over the D-bus and leaves the BP over the A-bus. Instructions from main memory are transferred to the control logic which selects the control memory (ROM) addresses. The microinstructions from the control memory enter the control logic which distributes the control fields to operating portions of the BP. The EAU receives its instructions and data over the E-bus and returns data over the E-bus.

Figure 4A:
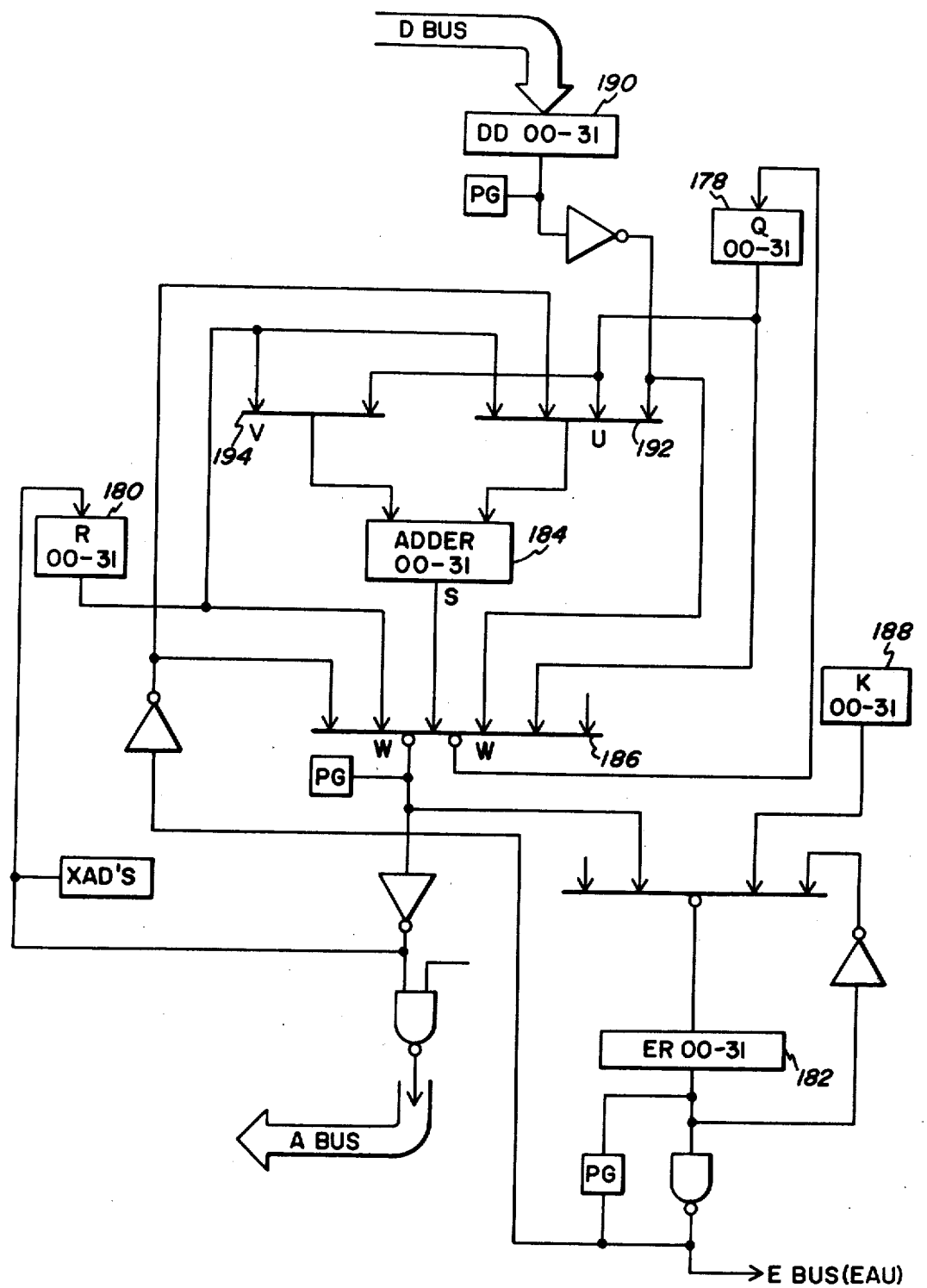
FIG. 4a is a Basic Processor flow diagram.

The operation of the BP begins in the idle loop and may be followed with reference to FIGS. 4 and 4a. The idle loop is entered following a reset or when the external control subsystem (ECS) signals the BP that the system control console (SCC) mode (explained in the following paragraphs) has been entered. The ECS control signal is sent to the BP over the diagnostic control path (DCP).

Two types of resets which will be discussed in greater detail later are received by the BP: reset/super reset and BP reset. The reset/super reset is generated:
During a power-on sequence
By the maintenance mode switch on the SCP
By the ACMM4 console entry while in the maintenance mode of operation.

The BP reset is generated by a ACRBP console entry (following a ACI) during normal operation of the BP. Both resets:
Initialize the program status words (PSWs) in the Q-register RAM 178
Load certain status registers (not shown)
Send an interrupt inhibit to the PI
Check the E-bus to the extended arithmetic unit In addition, the reset/super reset clears the Q-register 178 and R-register 180 prior to performing the tasks mentioned above.

While in the idle loop, the BP waits for one of three conditions to determine its next operation. Signals received from the ECS over the diagnostic control path control the selection of BP operation. These signals:
Hold the BP in the SCC mode
Cause the BP to enter its microdiagnostic sequence
Start a serial data transfer between the ECS and the BP over the diagnostic control path When the signal holding the system in the SCC mode is removed, the BP returns to normal operation and software control. So long as the signal is present, the BP remains in the idle loop and waits for one of the other two signals. The data signal causes the BP to accept a four bit function code and 32-bit data word from the ECS.

This transfer occurs over the DCP and enters the ER-register 182 of the BP. The BP performs the requested sequence and returns data to the ECS (if required) over the diagnostic control path. While in the SCC mode, all communications between the BP and the ECS are over the DCP. Note that the contents of the ER-register may be transferred through the adder 184 to the W-multiplexer 186. The function received from the ECS passes through the W-multiplexer 186 to the instruction register and control memory addressing logic.

During a load-normal operation (ZCLDN entered at the SCC) and after microdiagnostics have been performed by the MIOP, MI, and PI, the ECS transfers a function to the BP over the DCP. The BP then enters its microdiagnostic sequence. A successful completion of the microdiagnostic is indicated by one bit in a single clock status register. The ECS then issues a system reset, after which the BP returns to the idle loop.

The ECS follows the systems reset with the transfer of a function and device address over the DCP to the BP. The BP stores the device address in a Q-register. The function causes the BP to read a higher level diagnostic and the boot-strap loader from the K-register 188 and store them in their assigned memory locations. The Q and K Registers typically consist of a plurality of registers sequentially numbered.

The ECS places the BP in the run mode by removing the signal for the SCC mode. The BP then executes a diagnostic and the loader and the control of the system is transferred to the software.

An instruction read from memory enters the D-register 190 of the BP. Parity is checked and the instruction is transferred to the W-multiplexer 186. From W', the instruction is sent to the instruction register on the BPH module where the instruction is decoded. The control memory logic of the BP selects the starting address of the microprogram and the instruction is executed under control of microinstructions from the control memory.

In general, in FIG. 4a, operands enter the BP from the D-bus into the DD-register 190. DD-register data may be routed directly to the W-multiplexer 186 or through the U-multiplexer 192 to the adder 184. Outputs from the W-multiplexer 186 may be stored in the Q-register 178, sent to the ER-register 182, or through the cable drivers to the A-bus.

The adder has two input multiplexers, U192 and V194. Note that the Q-register may be sent to either input multiplexder. The adder in the BP is used for address modification along with the Q-register and R-register. The adder is used in the execution of only two fixed point arithmetic operations: addition and subtraction.

Fixed point multiplication and subtraction, floating point and decimal arithmetic are executed by the EAU. When one of these instructions is decoded by the BP, the BP sends to the EAU a 32-bit instruction word followed by two or more data words. The EAU executes the instruction received and transfers back to the BP bus results of the operation.

The BP uses the A-bus or Internal Bus 42 to transfer addressing information and data to the MI and PI. Outputs to the A-bus are through the W-multiplexer. Inputs to the W-multiplexer are from the adder, the Q-registers, the DD-register, the R-registers, the ER-register, and the E-bus from the EAU.

Parity is checked for information received after the D-bus, and parity is generated for information output over the A-bus and the E-bus.

PROCESSOR CONTROL WORD

The processor control word resides in register 30 of the Basic Processor's Addressable Q-Register. The bit assignment for Q30 are shown below in the accompanying table. By loading register Q30 the operator is able to perform maintenance-type functions such as halting and resetting the Basic Processor, setting address hold and activating various halt on fault controls. During normal operation it should not be necessary to access this word. The contents of the processor control word are not affected by either processor or system reset, but are automatically set to zero during power-on sequencing.

| Bit Position | Description |
| --- | --- |
| 0 | Retry Inhibit: If this bit is a 0, the basic processor will automatically retry the instruction which caused the trap to location X'4C'; if this bit is a 1, the basic processor is inhibited from retrying the instruction which caused the trap to location X'4C'. |
| 1 | Parity Check Inhibit: If this bit is a 0, parity checking of R register transactions is enabled; if this bit is a 1, parity checking of R register transactions is inhibited. |
| 2 | Watchdog Timer Override: If this bit is a 0, the watchdog timer is allowed to count; if this bit is a 1, the watchdog timer is inhibited from counting and the machine will not execute the Watchdog Timer Trap. |
| 3 | Watchdog Timer Alarm: If this bit is a 0, the Watchdog Timer Trap is enabled; if this bit is a 1, the Watchdog Timer Trap is inhibited. When a timeout occurs, a system reset is generated and the system will run to timeout again. This provides a dynamic loop for isolating the cause of the timeout. |
| 4-5 | Reserved (must be coded as zeros). |
| 6 | Address Hold: If this bit is a 0, the address hold is disabled; if this bit is a 1, the program counter is inhibited from counting (incrementing) causing the machine to loop on the selected instruction (i.e., when the machine is returned to RUN mode, the instruction pointed to by the program counter is executed continuously). |
| 7 | Processor Halt: If this bit is a 0, the processor is allowed to run under the control of system and P-Mode controls. If this bit is a 1, the processor is forced into the HALT condition. |
| 8-15 | Reserved. |
| 16-31 | Load device address. |

ADDRESS COMPARE WORD

The address compare word is located in Basic Processor Register Q31 and contains parameters defining the type of comparison and the desired action (alarm, halt, or none) on detecting an address compare. The various bit positions and their significance in the address compare are tabulated in the following table:

| Bit Position | Status | Significance |
| --- | --- | --- |
| 0 | 1 | Selects mapped address comparison. |

-continued

| Bit Position | Status | Significance |
| --- | --- | --- |
|  | 0 | Selects unmapped address comparison. |
| 1 | 1 | Selects address comparison during instruction access only. |
|  | 0 | Selects address comparison for all memory cycles. |
| 2 | 1 | Selects comparison only during memory write cycle. |
|  | 0 | Selects all memory cycle comparisons. |
| 3 | 1 | Selects page comparisons. |
|  | 0 | Selects word comparisons. |
| 4 | 1 | System turns on audible alarm for 220 microseconds each time on Address Compare occurs (maximum frequency 1KHz). |
|  | 0 | Address match alarm is disabled. |
| 5 | 1 | The processor is forced into the HALT state when an Address Compare occurs. |
|  | 0 | Address Halt disable. |
| 6-7 | — | Reserved. |
| 18-31 | — | Comparison address field. |

SCI OPERATION

In general, one of the primary tasks of the SCI module is to assemble and disassemble the ASCII characters as it receives them from or transmits them to the consoles. An output bit stream from the console occurs at a specific time interval in accordance with a selected bit rate. The processor keeps track of the timing by monitoring the communications clock. It samples the input and services the output at scheduled intervals to satisfy the asynchronous timing requirement of the characters at the specified communication rate. The control memory in the SCI module loops through its control program once every two hundred twenty microseconds or at a 4800 Hz rate. It monitors the input interface until it sees a start bit. This bit indicates the console is transmitting a character. Once a start bit is recognized, the SCI module must continue to sample the data bits at specific intervals. Bits are shifted into storage on the SCI until all eight of the data bits have been accumulated.

Output to the console is accomplished by taking a character out of stroage (the SCI output stack), putting a start bit on the line, and shifting the character out a bit at a time.

A set of commands enables the operator to communicate with hardware through the console. The control functions generated from these commands fit into three catagories: operator control commands, diagnostic control commands, and maintenance control commands. Certain "event messages" are provided to indicate possible sources of error in executing the commands. The commands and messages are discussed in greater detail in the discussion of the SCI microcode which follows.

In general, however, there are four operational modes recognized by the SCI control memory: Z-Mode, P-Mode, Single Clock Mode and Transparent Text Mode. A brief explanation of each mode follows.

Z-MODE

Z- mode has the command format $Z^C$XXX and provides the majority of hardware controls. The SCI receives a character which it recognizes as $Z^C$, sets a flag and shifts the $Z^C$ and subsequent characters from the I/O stream. The mode of the SCI is altered. The SCI prompts the operator with a new line and prints a parenthesis on the control console to indicate that it has entered this control mode. It then accepts the next one, three, or seven characters as a hardware control command executed independently of the software. Each character is echoed to the console display until the SCI gets a full complement for a command. For example, the interrupt command $Z^CI$, is completed with one character, while the system reset command, $Z^CRSY$, is completed with three characters. In either case, the function is performed and the SCI exits Z-Mode.

P-MODE

P-Mode is used to implement the diagnostic controls provided by the basic processor. This mode is entered by typing $P^C$. Once in P-Mode, every character is treated as a hexadecimal data or as a function character. A question mark is output following any character not recognized as a function character. A hexadecimal digit is shifted into storage in the PIC Module until the basic processor can accept it. If, while in P-Mode $Z^C$ is typed on the console, the mode changes to Z-Mode until the command is finished and then returns to P-Mode.

TRANSPARENT TEXT MODE

Transparent Text Mode provides for communications between a remote console and a local console even though the IO system is not working. In this case, the SCI simply echos to both consoles whatever it receives. This is distinguished by a parenthesis on each new line. The control command to enter and exit transparent text mode is $Z^CT$. Transparent text mode is overriden by the other three modes.

SINGLE CLOCK MODE

The final mode allows the operator to Single Clock the system and gather Single Clock status. The status is presented in the form of a print out on the console. The SCI actually enters a separate mode where it stops the clock and issues a display. While in this mode each space character causes a clock to be issued and a display printed. Single Clock Mode and the Single Clock Status Registers are discussed in greater detail in this specification.

When none of these four modes are active, a character typed on the console is transferred to the TSC Module. The TSC is a "device-controller" connected to a Multiplexing input/output processor. The MIOP is, in turn, connected to the system memories and central processing units via data and control paths. Input/Output transfers within the system are initiated as the consequence of execution of an "SIO" instruction by one of the arithmetic processors, causing the MIOP to initialize a device controller for either input or output.

From an overview the SCI is an interrupt driven processor. The logic block diagram of the SCI is shown in FIG. 2. The interrupt is a clock pulse generated by a timing divider at 4812 cycles per second. This frequency is selected as a multiple of all of the communications frequencies which the SCI handles. Each time an interrupt clock pulse is received the SCI cycles through a large part of its code structure looking for tasks which require processing and performing certain housekeeping functions. An essential characteristic of this design is that all tasks performed by the SCI have to be completed within the interval between interrupt pulses which is approximately 210 microseconds or the device will fall behind. Some features have been inserted in the coding to soften this requirement slightly by making non-critical processing tasks optional as a function of the amount of processing time available in a given interrupt quantum.

During a normal processing cycle, the SCI works through four communications routines, an error testing routine to detect mainframe errors, and a display sequence routine which refreshes the system control panel. These routines are shown in a flow diagram in FIG. 5. Each of the four communications routines, Channel A In, Channel B In, Channel A Out, and Channel B Out, handles a single path input or output for the A or B Channels. If processing is required in one of the communications routines, execution branches to that processing algorithm and performs whatever sequence of events is dictated by the current situation.

Figure 5:
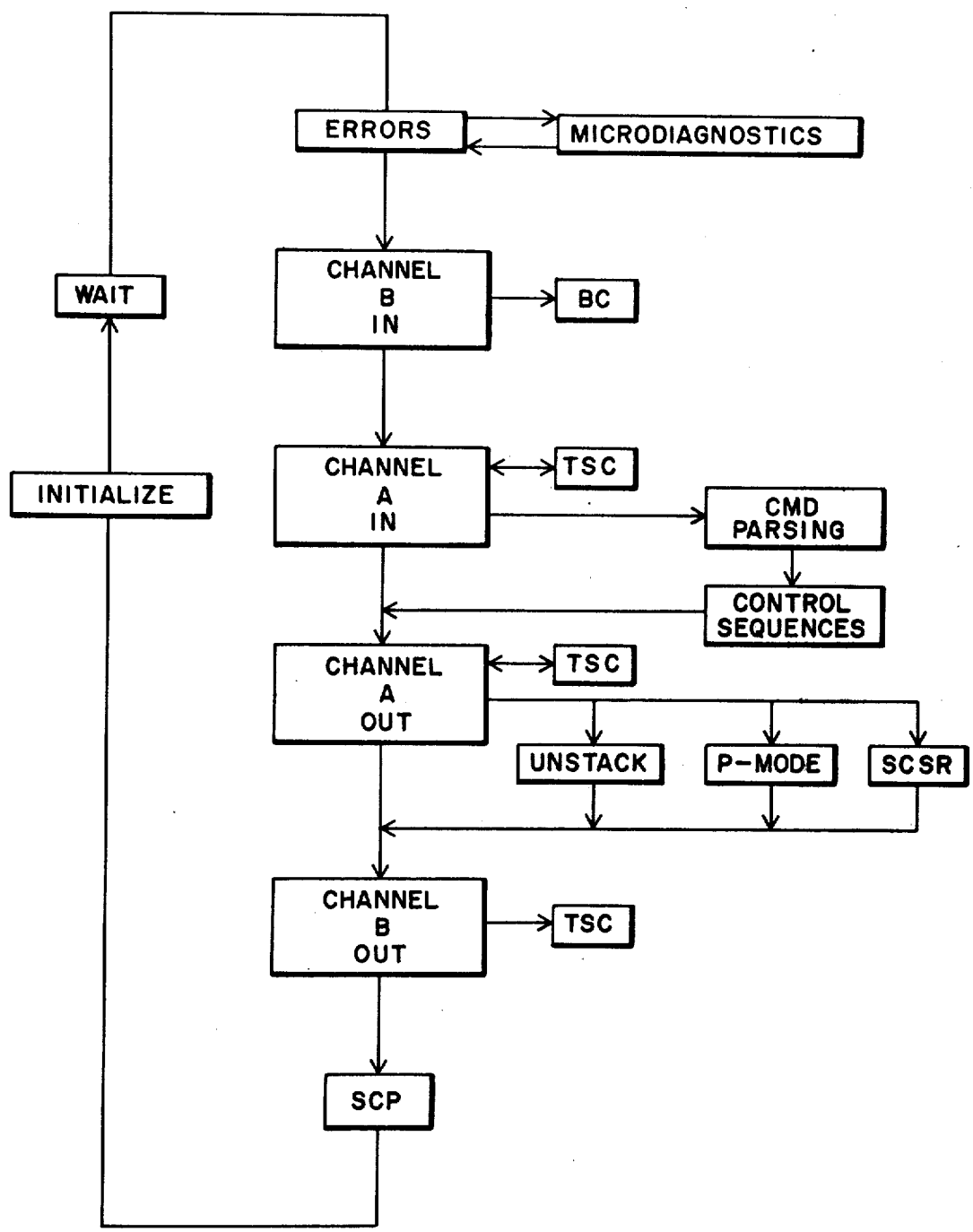
FIG. 5 is a flow diagram of the SCI algorithm.

For example, as shown in FIG. 5, the Channel B Input routine serves the BC function, Channel A Input allows communication with the TSC for software interaction and also provides C-Mode command processing and control sequencing. Likewise, Channel A Output handles TSC communications from software to the console, provides character unstacking, P-Mode operation and Single Clock Status Register information handling. The Channel B Output includes an alternate software communications algorithm for the TSC, and the Error routine also conducts microdiagnostic control.

The SCI code will be described as it is actually stored in the control memory, in a somewhat linear manner with digressions where appropriate. The beginning of the code contains initialization routines which establish status conditions in various registers—the scratch pad memory of the SCI. This is necessary to ensure that the SCI starts out in a predetermined state whenever it is powered up or given a master reset. Master Reset (Superrest) is performed under three different circumstances: 1) when power is initially applied, 2) when a power trap occurs, as one of the responsibilities of the SCI to sequence system initialization following the application of power to the system, and 3) when the super-reset command is issued either as an input command to the SCI or as a function of a switch on the System Control Panel. The object of the super-reset is in fact to reinitialize the SCI, something that does not normally have to be done. In the event of a fault condition, however, it may be useful to initiate this function.

The initialization sequence consists of, in addition to setting status flags within the SCI register, manipulating some of the interface latches that it controls, putting the system in a normalized condition to clear maintenance features, and insuring that all of the buses are at a neutral state. Also as part of initialization the SCI determines the communications frequency for the two different Channels A and B that it is supporting. The frequency information comes from three switches on a Configuration Control Panel which select operating speeds of 110, 150, 300 or 1200 bits per second for the A Channel, and select a default speed for the B Channel of either the same rate as the A Channel or 300 bits per second.

Following initialization the SCI falls into its interrupt idle loop (WAIT) where it sits and spins until a clock interrupt is received. In the idle loop it repetitively branches to a single control memory location while in a quiescent state.

Immediately following the idle routine in the sequence of the code is a test routine for determining error conditions in the system at large. This test routine is executed at the end of the interrupt processing cycle, if time is available before the next interrupt. Because the test routine involves many of the structural features which we'll describe later on we will treat that as an item at the end rather than the beginning of the actual sequence.

The interrupt signal causes exit from the SCI idle loop and entry to the Channel B input routine. Channel B is defined as the software remote trouble-shooting channel. To more clearly establish the relationship between these channels from a software standpoint, the external control system supports two communications channels which are functionally and logically independent from the software point of view. Channel B is reserved for remote trouble-shooting with software. Channel A is the operators console channel over which all system software operating commands are conveyed and over which the system transmits its status and messages to the operator. Provisions exist for coupling these two channels together logically within the microcode of the SCI so that they become functionally identical and in this case both physical interfaces become equivalent to Channel A. They OR logically into Channel A both receiving outputs from Channel A and both inputting to Channel A. In the coupled state Channel B on the computer interface side is quiescent. The Operator's Console channel, which is Channel A, has the special capability of hardware control which we generically class as PCP modes, that name coming from the old title for the operator's manual control panel which was the "Processor Control Panel". When the A and B Channels are coupled together both have the capability of using the PCP mode. The coupling or decoupling of channels is determined by the setting of a switch on the System Control Panel. The same switch may be used to disable operation of the PCP mode on either Channel, more literally on both Channels, and to restrict them to software-only-level communication. The reason for handling Channel B input before Channel A input, although Channel B is somewhat ancillary to the main process of the SCI, is that it is a shorter routine and is more predictable in its timing than the Channel A input routine. Therefore, it is convenient to get it out of the way quickly. Further, Channel B is the remote channel and in the event the machine is being remotely operated it is useful to execute Channel B function without first using time on Channel A.

CHANNEL B INPUT

Following the clock interrupt, execution is transferred to the Channel B Input routine. The first function of the Channel B Input routine is to clear the clock interrupt so that it will be possible to sense the next clock interrupt. The receipt of a new clock interrupt is periodically tested for in the body of the code. The Channel B input routine is characteristic of the communications handling method in the SCI. It works in the following manner: A register or status flag related to Channel B is examined to determine if the Channel is in the process of receiving a character. "Running" is the phrase used in the documentation. If this is the case, the execution branches to an intercharacter processing routine. If the channel is not running, then a test is made to see if the communications interface is in a so-called spacing state, that is, in the opposite state from its normal quiescent condition. The occurence of this state following a period of quiescence signals the beginning of a new communications character.

To briefly describe the asynchronous communications format, it should be understood that asynchronous communications means, literally, that character information occurs at a time which is not predictable to the receiving device. It is necessary, therefore, for the receiving device to synchronize itself with incoming information so that it may accurately extract the data bits. For this purpose, the asynchronous protocol is defined to consist of a "start" bit which signals the beginning of the character, some number of data bits — which in this case, and commonly, is 8 bits — and then some number of stop bits which in the case of the SCI or in the case of this system is either one or two stop bits. The stop bits are of a polarity opposite the start bit, and serve as a spacer between characters. Immediately after the stop bit, another character may begin, or the interface may again remain in a quiescent state for an indefinite period of time.

Figure 6:
FIG. 6 is a representation of a string of bits of a communications data word for describing the operation of asynchronous communications.
Figure 7:
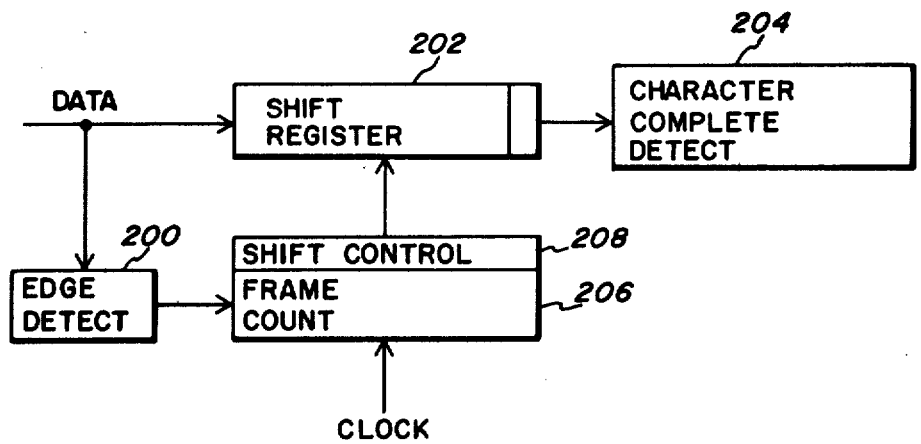
FIG. 7 is a block diagram of a portion of the SCI operation for handling asynchronous communications.

The way that the SCI receives these communications is shown in FIGS. 6 and 7. FIG. 6 is a representation of a string of bits which may comprise a communication word. FIG. 7 is a logic block diagram of the portion of the SCI used for handling asynchronous communications characters. The presence of the start bit is detected by edge detector as early as possible within the bit time. The bit time is determined by the operting frequency of the communications line. That is why it is necessary to initialize the SCI for specific asynchronous communications frequencies to determine the width of the bit interval. The SCI having sensed the beginning of a start bit — and it does sense the beginning since its clock frequency is in the worse case at 4 times as brief in time as the shortest bit interval — the SCI determines the center of the bit window, the time frame of the bit, as shown by the tick line 210 of FIG. 6 by a mathematical computation by adding a predetermined numerical value to a Frame Counter 206 and then decrementing that counter for as many clock intervals as are required to bring the register for that channel to a count of nine since in fact the start bit will also be sampled along with the data bits. The routine then exits to continue processing at the Channel A Input routine. On a successive pass following this initialization, the status flag indicating that the Channel is running will be true and so the Channel B input routine will increment its Frame Counter 206 and test to see if a carry-out condition has occured. Should this be the case, it will shift a bit of data into the Channel B Input Data Assembly Register 202 and increment the Bit Counter 204 for that channel. If the process of incrementing the bit count produces a carry-out signifying that all bits have been received the Channel B Input routine then sets status flags which a) indicate that it is no longer running and b) indicate for a subsequent processing routine that a character has been received and is ready for subsequent processing.

Also incorporated in the Channel B Input routine is an algorithm which tests for the special condition of a character which consists of all zeros. This character may be one of two defined telecommunications characters. Either the so-called Null character or the so-called Break which is in fact not a character but interruption of the data path for some indefinite period of time. The Break may have a special function in the software control of communications interfaces. It may, for example, be used for signaling operator attention and so it is specially detected — it is modified so that the TSC which is the I/O system interface for the SCI in communications can detect it.

Also in the Channel B Input routine is a special sensing protocol to detect a character sequence generated by a special purpose terminal device which is used to regulate the rate of transfer over the communications interface to that device. Specifically, to prevent overruns, a terminal of this type may stop receiving data after the transmission of certain characters — carriage return is one — and may not be available for further receipt of output data until it has emptied its buffer which it signifies by sending in an acknowledge character abbreviated ACK. This character is detected in the Channel b input routine and used to set an internal status flag which enables further output to the device.

Also, in the Channel B input routine is an algorithm to detect the condition where the System Control Panel switch that makes Channel A equal to Channel B is true. In this case, Channel B input is not forwarded to the I/O system through Channel B as would normally be the case, but it is input to the Channel A I/O path. The transfer of input data from the SCI to the TSC, which is the IO system interface, is accomplished through a special B and the Channel B Input routine initializes certain registers for linking to that algorithm by a) putting the received data in a transfer register and b) by establishing a key value in another linking register which passes destination and function information to the SCI/TSC transfer routine. In the case where Channel B is configured for normal communications — that is where Channel B input goes to software Channel B — the routine then falls into the TSC communications routine which serves the purpose of transferring the received data from the SCI to the TSC which, in turn, inputs it to memory through the protocol of the MIOP system. The TSC communications routine is shared by both the Channel B and the Channel A input routines and the distinction of where information is to be sensed and how the processor is to exit from the routine is contained in the code and link words stored in an SCI register called Register 22 and initialized before access of the TSC routine by the respective SCI input routine.

SCI Registers within the Scratch Pad A and AA Register blocks are numbered R00 through R63 and are assigned as follows:

REGISTER:
R00 CHA INPUT FRAME COUNTER
R01 CHA INPUT BIT COUNTER
R02 CHA INPUT ASSEMBLY REGISTER
R03 CHA OUTPUT FRAME COUNTER
R04 CHA OUTPUT BIT COUNTER
R05 CHA OUTPUT DISASSEMBLY REGISTER
R06 CHA FLAGS
R07 CHB INPUT FRAME COUNTER
R08 CHB INPUT BIT COUNTER
R09 CHB INPUT ASSEMBLY REGISTER
R10 CHB OUTPUT FRAME COUNTER
R11 CHB OUTPUT BIT COUNTER
R12 CHB OUTPUT DISASSEMBLY REGISTER
R13 SNGL CLOCK DISPLAY ADDRESS & FLAGS
R14 TOP OF STACK POINTER
R15 BOTTOM OF STACK POINTER
R16 ERROR MESSAGE CODE DIGITS
R17 CMODE TRANSLATION REGISTER
R18 CMODE FLAGS
R19 CMODE FLAGS
R20 CMODE FLAGS
R21 GENERAL PURPOSE REG
R22 GENERAL PURPOSE REG
R23 DATA OUTPUT BUFFER BIT COUNTER
R24 ZMODE FIRST CHAR/PDISP ASSY REG
R25 ZMODE SECOND CHAR/C COUNTER
R26 ZMODE CHAR CNTR AND FLAGS
R27 TSC TRANSACTION BUFFER
R28 P-MODE PHASE AND REPEAT CONTROLS
R29 P-MODE FUNCTION CHARACTER
R30 COMMUNICATIONS FREQUENCY STORAGE REGISTER
R31 CLOCK COUNTER FOR SINGLE CLOCKING
R32-63 OUTPUT STACK BUFFER

TSC COMMUNICATIONS

The next routines in the SCI code are the TSC Communications routines. The purpose of the TSC Communications routines, there are two of them, one for input and one for output, is to transfer information from the SCI which serves as the communications protocol receiving and transmitting device into the TSC which serves as the IO channel protocol transmitting and receiving device in the system. The path between the SCI and the TSC is the DCP bus as previously discussed. The structure of the system is such that there can be one TSC connected to the DCP bus somewhere in the system. Its physical location is not important, and the nature of the communications will be such that the transactions between SCI and TSC always take place satisfactorily wherever the device is located in the system. This location generality is achieved by assigning to the TSC a number of function codes, out of the 64 possible function codes on the DCP bus, which it uniquely recognizes.

The communications between SCI and TSC are asynchronous and they are controlled by the SCI. Essentially, neither the SCI nor the TSC knows what the other is doing. Either one may be busy at a given moment in time. Because the SCI is a more time-critical device, it has control of the transaction sequences. When the SCI wants to send an input character into the TSC, the SCI calls the TSC on the DCP bus, sends the character, and then goes away. The presumption here is that the TSC will always be available to receive data from the SCI despite their device asynchronism. The TSC has an interrupt routine in it which is triggered by a control code, 26, which is set by the SCI following transfer of a character. The requirement imposed upon the TSC is that it must remove a received character from its reception buffer within one character time so that information transmitted from the SCI will never interfere from one character to the next with itself — so that the SCI will not superimpose one character on another. The same buffer is used for both input and output on the two channels — four paths — which means that the TSC must be able to service information at minimum of four times the basic character rate of the interfere.

There are two entry points to the TSC Communications routine, either from the Channel B input routine or the Channel A input routine. They share this code and the manner of processing resulting from entry from Channel B or Channel A is determined by data left in two registers — one register actually contains status codes and the second register contains the data to be transferred. The Channel A or Channel B input routine will put the data in Register R27 and put in Register R22 a code signifying the path or branch out of the TSC routine and indicating the channel destination of the information. Code 01 is input from Channel B. Code 00 is input from Channel A.

The actual sequence of the TSC input routine is straightforward. A control code is issued to clear the DCP bus and the first data bit from Register R27 is put on the bus. A control code CRLC 25 is then initiated to start the TSC shifting. Subsequently, the SCI shifts out the remaining 7 bits of the data byte to the interface and then immediately following shifts the 4 leading bits of the TSC link register, Register R22, which contain the code specifying the type of operation which the TSC must perform. Following that, a CRL code is issued to stop shifting, which preserves the information in the TSC input buffer, and sets the Attention flip-flop saying that a transaction has occured and processing is required in the TSC. Then the DCP bus is released, flags are cleared, and the routine branches out based on the low order bits of Register R22 to either the Channel A Input routine if it had just processed an input character from Channel B Input, or the Channel A Output routine if it had just processed a character from Channel A Input.

The reason for receiving serial communications, deserializing it and converting to a parallel form and then reserializing to transmit internally to another asynchronous device is because of the physical characteristics of the system, it is inconvenient to have the TSC and SCI in the same physical area, in fact it is desirable to have the TSC able to fit into a variety of locations and in fact to live on one of a number of possible MIOPs in the system. A technical reason for the reception by the SCI and the retransmission to the TSC is that the SCI has to monitor the input data streams for both Channels A and Channels B and routing those in different ways, depending upon the SCI's state. If the SCI is in a PCP mode, for example, input data is not sent into the IO system, it is stopped at the SCI and acted upon there. Likewise, if the system is in a software input mode, the SCI must still watch the data being transferred over the bus to detect the control characters which might put it into a control mode. Finally, the asynchronous protocol used by the TSC is organized so that there is no request-response relationship between the SCI and the TSC. This is partly a convenience and partly a necessity, since the SCI which might cause a halt in SCI processing. With the command data transfer scheme the SCI sends data whether or not the TSC is prepared to receive it, with the assumption ensured by certain cautions in the design, that the TSC is operating normally should be able to receive the data and to handle it. There are in fact cases which the TSC will receive data and not make any use of it. An example of this is when the TSC is not utilized for input on the data path. In such case, the data is lost on the receipt of the successive character.

A feature of the external control subsystem is that it provides echoplexing, or return of an input character to the console display, of input data without software intervention. For control level operations, echoplexing is accomplished by the SCI. Input data is automatically retransmitted to the sender for purposes of verification. In the case of software type input the SCI does not echoplex but the TSC does by receiving a character and then at some subsequent time retransmitting it over the corresponding output path. An advantage of this two-level structure is that it provides a continuous and automatic verification of the operation of the internal paths of both the SCI and TSC. In fact, due to the nature of the device, if the echoplexing operation words, one can assume that as much as 90% of the hardware of both the SCI and TSC is in fact functional.

CHANNEL A INPUT

Figure 8A:
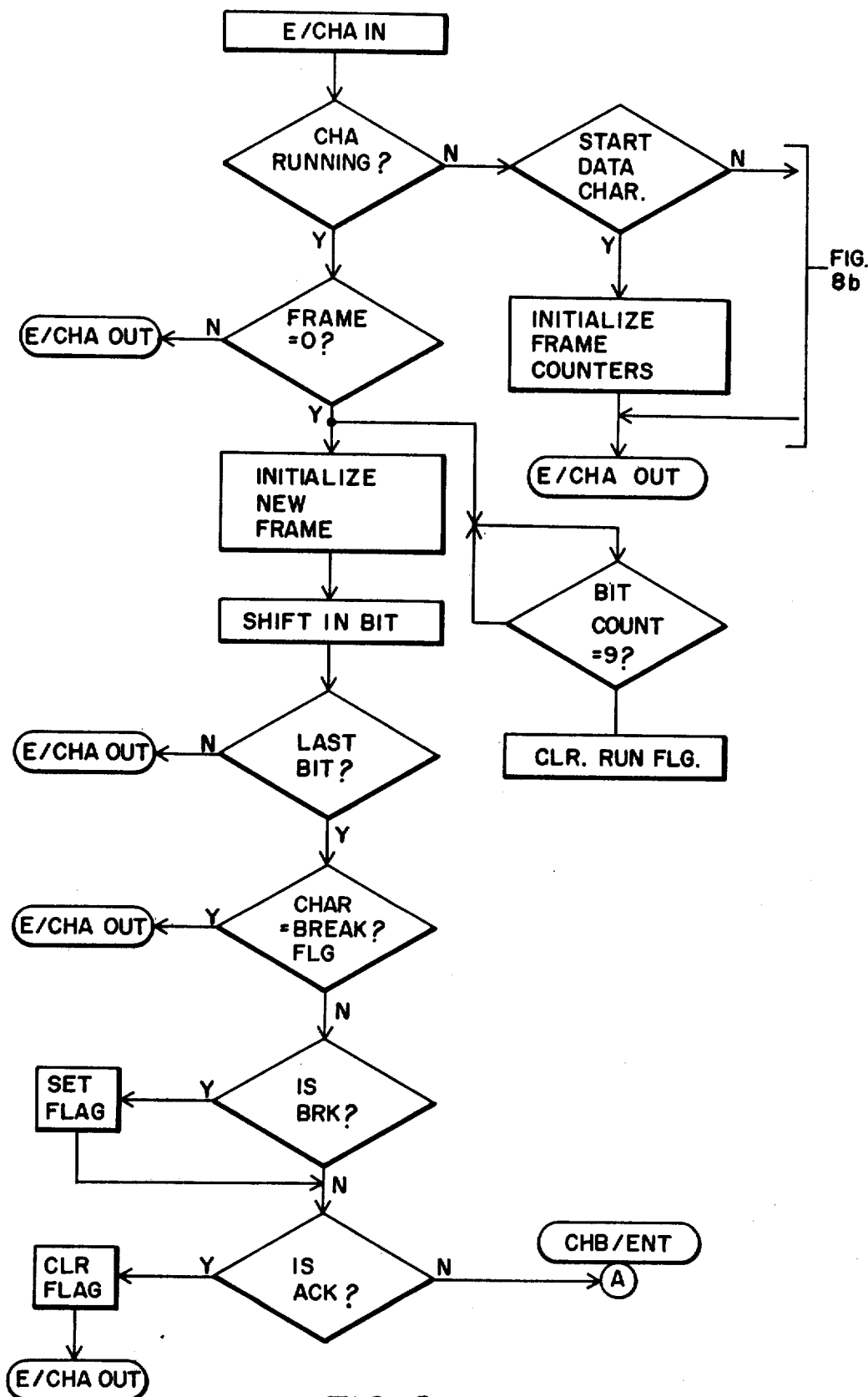
FIG. 8 is a flow diagram showing the SCI Channel A Input sequence.
Figure 8B:
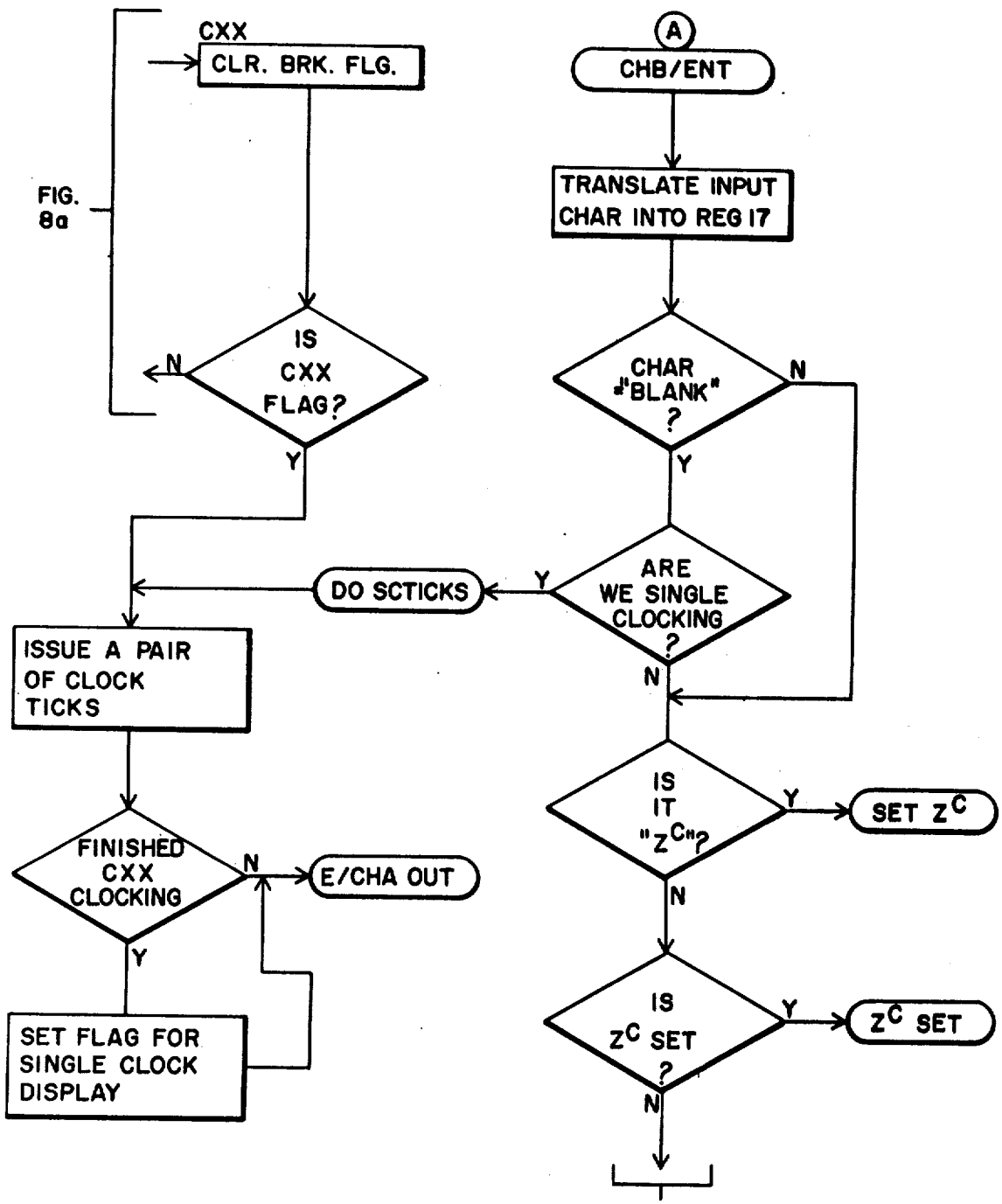

The Channel A Input routine follows the TSC communications routine and is much like the Channel B Input routine as will be noted later. Figure 8 is a flow diagram of Channel A Input, and because of the similarities to Channel B Input, reference may be made thereo for either channel.

A minor difference between the Channel Input input routine and the Channel A Input routine is that at the beginning of the Channel A Input routine a decision is made as to what communications frequency the input interface is to use. The two choices are a) the frequency established by the frequency select switches on the configuration control panel or b) the frequency of Channel B which is one of two alternates. The program examines two outside switches to determine whether it is to use the Channel B frequency by virtue of the switch settings or to see if the two channels are coupled together in which case it is mandatory that it use the same frequency. If neither of these conditions is true, Channel B will operate at a 300 baud input rate. The Channel B communications frequency can be changed simply by reconfiguring the relationship between Channels A and B, without resetting the SCI. This can occur from one character to the next in effect, whereas the basic communications frequency for the system — the overall set of options — is determined only at the time the SCI is reset. This has the effect of an interlock, it says that changing the master frequencies can only be determined at break points when the system is being initialized but changing the configuration can be done during normal operation, at the risk of introducing a possible communications error, for the convenience of reconfiguration. In the Channel B Input routine there are, in addition to the basic communications input functions, a number of functions that relate to the control features implemented by SCI in its various PCP modes.

As previously mentioned, the Channel A Input routine works very similarly to Channel B Input routine, that is, it looks to see if the channel is running, if it is it looks to see if the frame count has reached zero after incrementing the frame, if that not be the case, it exits. If the frame count goes to zero then it initializes a new frame and shifts in a bit, and checks to see if that the last bit, if it is not, it exits, if it is the last bit it looks at that character and checks to see if it is one of a set of characters that are especially handled in the input routine. First, it checks to see if the input character is a break character which will consist of all zeros. If the character is a break it sets a flag. If the character is not a break it checks to see if the flag set by a preceeding break character is true. In that case, the routine intentionally ignores the input character. The reason for that is that the break code is not a character per se in the communications protocol, it is an indefinite interruption of the line, and because of this indefinite quality it will tend to be sensed as a succession of characters. But at the end of the break transmission, there will be the break which is being interpreted as a character but which is in fact just an idle state of the line. The purpose of this flag arrangement then is to sense when a break has happened and designate as garbage the single character information which immediately follows the break.

A similar detection scheme is used for the Acknowledge character. This has to do with handling of the Diablo Hy-Type mechanism which send back an Acknowledge character following receipt of a line of data to indicate that i can receive additional data. If an Acknowledge character is sensed, then a flag is cleared and the character is otherwise ignored.

Should the received character be none of the above-break or acknowledge, the SCI then goes to the Channel B entry routine which is part of Channel A Input. The Channel B entry routine which really services Channel A, looks to determine the nature of the received characters, specifically, it wants to find out if it is required to take any action as a consequence of receiving the character other than just sending it on to the TSC. It looks to see first of all, if the character is a blank. It if turns out that the character is a blank then it checks to see if the flag which indicates presence of Single Clock Mode is true. When Single Clock Mode is true, it is possible for the operator, by typing in blanks to cause the machine to step its clocks one time for each flag. In the case that single clocking is true, and the character was a blank, the Channel A Input Routine goes to a sequence called "So SC Ticks" and issues a pair of clock ticks to the system. It is the nature of the machine that one clock is defined as two ticks o visa-versa. After issuing the clock tick the contents of a counter which is incremented on each pair of clock ticks is compared with the contents of another counter that determines the number of clock ticks to be isused. This is controlled by other routines that we will encounter later. If it turns out that just exactly the required number of clock ticks have been issued, a flag is set to sebsequently initiate Single Clock Display in the Channel A Output Routine and then an exit is made to the Channel A Output Routine. Otherwise, no flag is set and exit proceeds to the Channel A Output Routine anyway. If it turns out that the character that came in was not a blank, that it does not really matter if we are Single Clocking or not, but we check to see if the character is a Control Z which is the initiation character for an entire class or control operations. If it was, we branch off to the control routine called "SET ZC". If it was not a Control Z we check to see if a Control Z has been received recently and we are in the Control Z mode. If that is the case, then this character will be part of a command, a Control Z command, and we branch to a routine called "ZC SET".

If it was not a Control Z, and a Control Z was not set, then we check to see if PCP mode is enable or inhibited. This is controlled by a switch on the System Control Panel and the reason for inhibiting it is to prevent people playing with the control functions which can affect the inner state of the machine. If it turns out that PCP Inhibit is set, then the only thing that can be done with the character is to send it into the TSC. We initialize the set of links for the TSC input routine in the same manner as was done with Channel B and then the execution branches to the TSC Input Routine. After execution of that, it will branch to Channel A Output Routine. If it turns out that PCP Inhibit is not set, in another words, if PCP operations are enabled, it is incombent upon the SCI to check first if the received character is a Control P which is the header character for the mode. If it is, it branches off to a routine called SET PC. If it is not, the SCI checks to see if it is already in PC mode. Should that be the case, it branches off to a routine called PC SET. Finally, if it is not a Control P character or function of the SCI checks to see if the flag indicating Transparent Text Mode is set.

The Transparent Text Mode is a special feature which is put in both for maintainability purposes and for the convenience of the operator during remote trouble-shooting. It allows information to be exchanged between the remote trouble-shooting console and the local operator's console without that information being examined by the SCI for control content or passed in to the system software for processing. The reason it is transparent is that the information shows up on the communications devices but never gets into the functional devices that operate on system status or software. If the Transparent Text flag is set, then the SCI enters a small checking routine in which it converts carriage returns and line feeds into the same character. This is necessary to bypass an inconsistency in coding between various telecommunications devices. Then it puts the data character on the stack for output to the Channel A device some time later. All output on the Channel A device is run through a stack maintained by the SCI. Various routines within the SCI code generate output information and leave it in the stack where an output routine will asynchronously and independently pick it up if there is anything to be sent and transmit it to the device.

One other function is performed by the Channel A Input Routine. If it turned out the start of the routine that Channel A was not running, that is not receiving a character, and there was need to start receiving a character, then execution is transferred to a clocking routine, associated with one of the control functions. The purpose of this clocking routine is to single clock the entire system and the reason for executing it at this point because under the definition of some of the clocking functions it is possible to generate a rather large number of clocks repetitively with the single command. This is the location in the code which allows that function. If the Multiple Clocking flag is set in the SCI (called the "CXX Flag") then at this point the Channel A input routine issues a pair of clocks and then checks to see if it has issued the requisite number, if it has not it branches out, and if it has, it sets a flag so that a Single Clock Display is initiated later on in the processing sequence.

Since the Channel A Input routine involves quite a number of functions, not all intimately related, the following is a brief summary of the functions in more general terms. First of all, Channel A Input receives communications data in essentially the same manner as the Channel B Input routine does. When it has received data it examines the data for correspondence with various character codes which require special operations and these special operations relate to the characteristics of the system itself — the way it responds to input data in the case of the Break or a characteristic of external devices in the case of the Acknowledge character. Or information that relates to internal control functions, such as is the case with the Control Z and Control P characters and characters which are received while one of the other of those modes is active. The same is true of the Blank character for single clock initiation. It does one final thing and that is to perform an updating task which is not a part of the input sequence per se, but is merely a logical place to do the clock stepping function, because the clock stepping function is similar to an input in that under certain circumstances it will generate an output. The same general characteristic is true of the functions associated with the control Z and Control P routines — that they are likely to generate an output as a consequence of an input and therefore they need to be handled in advance of the output servicing routines.

CONTROL MODES

The discussion of the SCI code should be interrupted at this point to examine the Control Z and Control P sequences which have been referred to and which are entered in fact as a result of, events in the Channel A Input routine. For convenience, a list of Control Z and Control P commands and functions is also attached hereto as Appendix B.

The first special mode or special condition which the Channel A Input routine looks for is to determine whether Control Z characters are input. In that case the routine branches to a routine called Set ZC. The function of the ZC SET routine is to initialize the SCI into a Control Mode where it will be able to detect and act upon the actual code characters which follow the Control Z. SET ZC (line 1604 of the appended listing) first sets a flag that indicates the SCI is going into Control Z Mode. It then echos a sequence of characters that have formatting and esthetic functions as their primary purposes. Although the primary role of the external control system is to provide functional control and information display for the computer system, the implemented formatting and human factors characteristics of the interface between the machine and the operator cannot be underestimated in their importance. It is a prime consideration in the design of this system to make both the input sequence and the output sequences as humanly comprehensable as possible. The requirement is to avoid ambiguity in the presentation of data; to present data in a neatly formated manner so it's easy for the operator to scan and to clearly differentiate between types of data display where there is any potential for confusion or misinterpretation. Most of this is accomplished by format and by the selection of codes which are humanly recognizable. For example, most of the function codes, used in the command sequences are arranged so as to be mnemonic and to have some phonetic correspondence to the functions which they perform.

The function of the Set ZC routine is to initialize the state of the SCI Control Z Mode and then to transmit formatting inforamtion to the Operator's Console device or the trouble-shooting device, (Remote Console) which signifies entry of this mode and which leaves space for subsequent transmission. The format is to index the display device to a new line and to type a left parenthesis to signify that Control Z Mode has been entered.

Following that sequence of operations, the Set ZC routine branches to the Channel B Output routine. At that point it has initialized the system for further input and it now waits for the operator to type in a command. In the Channel A Input routine, following an unsuccessful test for the Control Z character as an input, the code tests to see if Control Z Mode has been set as it would have been done by the sequence just described. In that case, the execution branches to a routine called ZC SET. It will be recalled that when ZC SET is entered, it is known that a Control Z has been transmitted sometime within recent history and the SCI is in this Control Mode. The purpose of the ZC SET routine is to accumulate control characters until there are enough characters to constitute a control command. The length of a control command is either one or three characters in the case of ZC Mode, with one exception which will be treated later. The AC SET routine is entered each time a character is received with ZC Mode active, looking for that combination of characters which will allow it to proceed and process interpretations of command. The ZC SET routine (beginning on line 1253) commences by echoing the character which it has received. This is done by putting the character on the register stack R32–R63 and incrementing the stack pointer, then it executes a brief translation routine which converts the input characters to upper case should they be lower case alphanumeric information. This is a matter of slightly altering the codes of the lower case characters and it is done merely for consistency in the later coding sequences. The ZC Set routine then examines the character and determines how many other characters it has received. Specifically, if this is the first character following a Control Z, it checks to see if it is the character I which signifies an interrupt command — that is one of the single character commands — a character T, which signifies the Transparent Text Mode command, or a character S which signifies the Sense Switch Command. These define control functions, which will be discussed later. To complete the description of the input logic of the ZC SET routine, it is seen that the routine upon receiving one character, if it is not one of the special functions noted above, sets a flag indicating "first character following ZC" and puts the character in the buffer. The next time the routine is entered, which will be some substantial time later, based on this flag the SCI determines that it has received the second character after the Control Z, and then sets another flag. The third time ZC SET is entered it should have a complete command so the routine enters the sequence called "Z PARS" in which it determines the nature of the command and either sets up the conditions for executing it or directly the command.

Returning to the Single Character commands briefly, the implementation of the Interrupt command, which is a single function command "I", is a simple setting of a CRLC code which causes a pulse on the interrupt interface connection unit. CRLC codes are defined and attached as Appendix A. The Control Z T command (a second single character command) similarly causes setting (actually causes toggling — a binary state reversal) of the flag for Transparent Text and then generates an exit. The Senseswitch command, Control Z S, is a somewhat different case than the other one letter commands. Senseswitch is actually a 3 or more letter command, but it is one of the few commands that is permitted in the case that the console functions, that is the PCP modes, are inhibited by a switch on the system control panel. If the first character of the received command is an S, the SCI is permitted to go ahead and parse the command even if it would not otherwise parse a three character command.

The state that the SCI enters after its determined that three command characters are received, is one of executing the Z PARS routine. The first step in the Z PARS routine is to set an event code into Register R16.

The event code is a message which is transmitted to the operator if for some reason the command is unacceptable. This merely allows a simpler way to get the message out to the console when a command is found unacceptable. For the first group of command event A1 is put into the message buffer or the error message buffer. A1 means that a command can't be executed when the machine is running. The Z PARS routine then examines the characters in the three registers which are Registers R24, R25 and R2. These contain in sequence the last three characters that have been received. The first comparison is for an S. If the character in 24 is an S then the Parsing routine branches to the sequence SXX and looks to see if the second character is also an S and finally looks to see if the third character is a W. It should be mentioned that if any of these comparisons fail, there is a branch to an exit case. For example, in the case of a comparison where an S is found and then the second character is not an S, that is a case which is not defined in the command set and the routine exits through routine called Z Abort, causing transmission of a message to the operator indicating that the command can't be accepted.

In the case that the command was an SSw the status of the system Sense Switches are displayed. This is done by 1) echoing, as is always done with Control Z Mode, the input character, 2) then appending an "equals sign" into the output stack, and 3) finally communicating with the System Unit for its Senseswitch status. This is done by looking at the Single Clock Status Register 13 in System Cluster 7 which is the preassigned location for the register containing the Sense Switches. (The preassignment, of course, relates only to this preferred embodiment.) The status codes are shifted in as four binary bits and translated into binary 1's and 0's by the Sense Switch routing (lines 1326 through 1345 of the code). That information is put on the stack as a four-character display and the routine goes to Z Exit which takes care of spacing and typographical functions.

If the first character was an S and the second one was an S but the third was not a W, the SCI checks to see if the third number is in fact a numerical digit, or more accurately a hexadecimal digit. A special coding of the Arithmetic Unit (94 in FIG. 2) is provided in the SCI to make this test for a hexadecimal digit a simple fuction. Part of the output of the comparison logic of the ALU is an indication whether the number of the input to the ALU is a hexadecimal digit or not. In the case that it is, the system is first halted — the entire computer system is halted briefly so that the updating of the Senseswitches will not interfere with ongoing processing. The SS No. commmand is a means of setting the system Senseswitches (which constitute four binary bits) to a new value. There may also be programmatic means of setting these Sense Switches and the necessity for halting the system is to avoid interference between possible programmatic setting and the psuedo-manual setting accomplished through the SCI.

To update the Sense Switches (lines 1346 through 1369) CRLC codes (Appendix A) (control functions on the DCP bus) are issued. All of the Sense Switches are cleared and CRLC codes are issued to set the ones indicated by the input command. From zero to four bits are set depending upon the input data. The setting routine then branches to a segment of code that starts the computer system operating again. (Actually it determines whether the system was operating when it had to stop it to change the Sense Switch, and if it was it restarts it. If it was not running, it doesn't do anything.) It then displays the Sense Switches which it just set, to provide a visual verification of completion of the function. Following that is goes to Z EXIT which will be discussed later.

If the input character is not an S, then on line 1285 of the code a check is made to see if it is a B. If it is, a branch is made the BXX subroutine which determines whether the second character is a P. If it is not, it goes to an abort. If it is a B, it assumes that the third character will be a hexidecimal digit. The hexidecimal digit is placed in Register R20 as the number of the Basic Processor which the SCI will address for Basic Processor control functions in the Control Z Mode. The BP Number command is a means directing the control of the SCI to any one of a number of processors in a multiprocessor system configuration. Following those acts, BP No. exits through the Z EXIT routine.

If the first input character is not a B, Parse determine whether it is an E. In that case, a branch is made to the EXX Routine. The E # # is analogous to the BP # # command but where BP # sets in the SCI a BP address, the E # # command stores in the SCI the two digit hexidecimal value of a Single Clock Status Display cluster/element pair. The EXX command, if the first input characters a C then the SCI assumes that the branch is made to the CXX routine to see if the second character is an L and the third character a K. Should this be true, a check is made to see whether the system is in a Maintenance Mode.

The CLK command causes the system to be put in Single Clock Mode. Since it is important that this not be done during normal system operation to avoid loss of data, an interlock called "Maintenance Mode" is used to act as a means of preventing this. If the system is not in Maintenance Mode, then an error flag is set and the Control Z command is aborted, and the operator is allowed to enter another command. If the system is in Maintenance Mode, first a flag is set in the SCI to inidcate that the clock will be stopped and then the interface latch which stops all the clocks in the system is controlled. Finally, the SCI register which is a counter of single clock pulses entered is initialized by setting to zero, and the acceptance of Single Clock Mode is signified to the operator by clearing the screen of the display and setting a flag which will, in a subsequent task, generate a Single Clock Display at the Single Clock Register currently being pointed to.

If the first character is a C and the second character is not an L a routine that is called C # # is entered and the assumption is made that two numerical digits follow. These two characters are translated into binary values and stored in Register R25, as two-4 bit digits. Register R25 contains the count value for extending clocking. This is an automatic function where based on a C Number Number type command the machine will be advanced many clock times automatically by the SCI. Finally, the extended clocking flag which initiates extending clocking is set and the routine is exited. The discussion of Channel A Input will show how the extended clocking sequence functions from these initializing parameters.

MAINTENANCE MODE FUNCTIONS

If the first character in is not a C then a check is made to see if it is an M. If it is an M, a branch is made to the routine MXX which checks to see if the second character is also an M. If that's the case, the sequence then looks to see if the third character of the sequence is a 0, 1, 2, 3, 4, 5, 6, 7, 8, 9, A or F. These are a class of functions which are called Maintenance Mode functions and they perform special control tasks in the system that are primarily for maintenance. The first three or the first four Maintenance Mode functions are permitted when the system is not in Maintenance Mode. The remaining ones, 4 through F are only permitted if the system is in Maintenance Mode.

MM0 is a general "clear" command for special modes and states inside the SCI. It clears all of the repeating and stored functions which the SCI would otherwise remember, simply by clearing the SCI flags. The three functions which it explicity does in this version are to clear the system interleave and clock margin control flags and clear repetition of control P Mode.

By setting a flag the MM1 function initiates a single clock display capability that's only meaningful if the system is also incidentially in single clock mode. This function makes the system continuously display the status of the Single Clock Register which has been specified beforehand, and after each display to advance the system clock by one tick. Most of this function is handled under the Channel A Input routine.

The MM2 function set Single Clock Scan Mode which is a display option that allows 16-register SCSR display from one request, whether it's a manual stepping of the system clock or an automatic stepping of the single clock, or any other function which would generate the display of the Single Clock Status Register. Instead of just showing one register it will show all 16 registers which may be allocated for a given cluster, where the cluster is the one specified as the first, or the high order 4 bits of the Single Clock Status Register address that has been stored previously. This function is also executed within the Channel A Input routine, based on the setting of the MM2-controlled flags.

Control function MM3 arms an automatic repeating function for P Mode operations. This is similar to the MM2 function except it relates to the processor control (P Mode) class of operation and it causes an actual function to be repetitively executed at the rate at which output display takes place. Usually when a Control P function is executed there is a succeeding display of some 20 or 30 characters which gives information on what has been done. The MM3 function causes the machine to cycle at whatever rate the display occurs. Examples of the use of this function are: to automatically cause the machine to single step instructions; to execute it's current instruction routine or program at humanly perceptable speeds; or to examine sequentially an indefinitely long string of locations inside the system Main Memory. It may also be used to write a given value into a succession of memory locations. The import of this will become clearer with description of the P Mode functions themselves.

Function MM4 is a special function which derives from the cautionary desire for a way of resetting the system of the SCI and its control functions by manual intervention. MM4 generates a function called "Supper-reset" which causes the SCI to reset itself and, in the process, causes the entire computer system to be reset and reinitialized. This can be useful for recovering the system from a hang-up condition when a fault has occurred, and also as a way of getting the system back to a known state of configuration. MM4 is the first of the Maintenance Mode only functions, the implications of accidential operation of MM4 can be clearly seen.

MM5 is a function relating to microdiagnostic execution. MM5 sets a flag which causes the microdiagnostic code, when accessed, to repeatedly initiate microdiagnostics and test their outcome on a single processor element in the system. This differs from the normal scheme of microdiagnostic execution where a scan is made of all elements of the system and each one is run through its microdiagnostic paces in turn. The one application for the MM5 type of microdiagnostic looping function is to allow service personnel to examine with an oscilloscope the operation of faulty system elements should other diagnostic means be not available.

The MM6 function is also related to microdiagnostics. It causes microdiagnostics to be initiated on a single processor element while the system is in Single Clock Mode. This is a function that would not otherwise be possible because a certain number of clocks are required by the processor element to recognize the microdiagnostic signal and when it's being single clocked the SCI would not be able to get it into this mode. This is a special provision for single clocking through the microdiagnostics. Once the flag is set, it branches to a routine called "Select" which will be discussed later under the microdiagnostic sequence.

The MM7 function serves the purpose of setting low clock margins for the system. The value of setting low clock margins can be two-fold. First, for diagnostic purposes it is desirable to determine that the system can run at a lower than nominal master clock rate. Also, it is possible that a system which has a failure at nominal clock speed will operate at a reduced clock speed, so the ability to set low clock margins act as a potential means of creating degraded operation instead of hard failure. This is set by a control command internal to the SCI which operates in the interface latch that in turn directly controls the system clock generation module.

The MM8 function is a companion to MM7, it sets the clock from normal to high margins which is used primarily for diagnostic verification. If the system successfully runs at high margins it is likely to run at nominal clock speed.

The MM9 function controls the override of system memory interleave by setting a latch on the SCI. Normally, the memories within the system are interleaved to improve the access to cycle time ratio to the memory. For some diagnostic functions, it is desirable or necessary to test the memories in a noninterleaved mode for fault isolation. This function overrides the interleave.

The MMA function causes all output on the Operator's Console or PCP channel suported by the SCI to be inhibited when the system is in any of the Control Modes. It has previously been noted that there are some functions which repeat themselves at rates which are determined by the frequency of output from the SCI display, in other words, the communications rate to the Operator Console device. Among these are Single Clocking of the system, repetition of microdiagnostics, and stepping of program steps in the system. It is desirable to be able to repeat these at human speeds and that is what the display function does. But it is also desirable, in some cases, to repeat these at speeds which are between the normal speed of operation and human speed. By eliminating output, data transmission the MMA function allows these looping functions to proceed at a faster rate, either to get past long sections of sequence or to allow oscilloscope analysis of signals within the system.

MMF function is used to change the frequency of communications to the console device. It causes the frequency switches which are initially examined during SCI initialization to be reexamined and a new set of communications frequencies to be determined. This has the net effect of permitting a change of the console frequency without requiring to reset the overall system.

If the first character of a Control Z sequence is not an M, a new class of command parsing is entered into on line 1298 of the code. A test is made to see if the system is running. The commands preceeding this point can all be executed when the system is running. The commands following this point cannot. If the system is running, and such a command is detected, an error message is generated indicating that the command cannot be accepted. If the system is not running the parsing sequence is continued. There is a special condition; if the machine is ostensibly running, but in control P Mode, it will not in fact be running, because Control P Mode implicitly halts instruction execution. In the case that the machine is in control P Mode, even if running, the parsing can continue.

The next character that's looked for is an L. If that is the case, a branch is made to the routine LXX to see if the second character is D. If it is not, we send out an error message; if it is, a flag is set to allow capture of four more characters after the third digit. These four characters are intended to be hexadecimal digits which specify a load address. With the flag set, an exit is made and then the "ZC Set" sequence counts up four more input characters and then returns to the point where we proceed. With seven input characters, and knowing that LD are the first two, a check is made to see if the third character is an N. If the third character is an N a branch is not made to a routine, but first of all, the microdiagnostic pointer register is initialized to its beginning value since the LDN function is "load normal" which involves execution of microdiagnostics, initialization of the system for loading, memory clearing, and finally execution of the load function itself.

There are three functions in the "load" catagory. Load Normal is described above; it serves to send a load address into the system, execute microdiagnostics, initialize the system for loading, clear the memory and then go to load sequence execution which starts the machine running. Load Special does a similar function but it bypasses the microdiagnostics. The reasons for this are to shorten the sequence, to make it possible to load a machine which has a microdiagnostic fault, and to allow programmatic diagnosis of a fault detected through microdiagnostics.

The function called LDT serves to set the entire system memory to a given value, a value that's been stored in one of the Basic Processors Q Registers, previously by manual interaction from the operator. Function of this is again primarily diagnostic. If there is a memory location which is not functioning properly, it may be identified through use of LDT. The LDT function is executed directly, that is, the detection sequence following label LXX looks to see if the Control Z code is an LDN or an LDS and in the case that it is not, checks to see if it is and LDT. If it is an LDT, it puts a function code in the register reserved for communication with the Basic Processor (R29) and then it sets the Register (R28) which is the phase counted for Basic Processor communications to a hexidecimal value of F. The phase sequence for Basic Processor communications will be discussed later. Briefly, however, it initiates a subsequent sequence of events which causes the function code 14 to be sent to the Basic Processor which then executes the Memory Set function. The SCI completes its Control Z sequence and returns to a quiescent state in the meantime. The LDN and LDS functions are uncommon in that they consist of a six character input, and a seven character display. On the display, the first three characters are format of the next seven characters, three are for the code and four for the load address of the device which will be used by the Basic Processor in system loading.

If an LDS or an LDN is detected, flags (bits) 1 and 5 in Register R26 are set. In the case of an LDS flag 4 in Register R26 is also set. Then the routine branches to the Channel A Out entry point to continue with other processing. On receipt of a subsequent character the LXX routine is reentered because the LD is still in the input character registers, the last digit having been overwritten by its successive character. A test is made to see if that successive character is an ASCII digit. In the case that it is, a branch is made to the PASSADDR routine which is a function that operates under the PC Mode sequencing and its task is to transfer information digits from the SCI to a collection register in the PIC associated with the Basic Processor which is currently selected by the SCI. This is the Basic Processor which will be responsible for the load operation. One Basic Processor performs the load sequence for the entire system. The detail of the PASSADDR routine will be described below under "P Mode Sequencing." It serves to get the input digits for the load address successively into an accumulation register which is adjacent to the load BP. When the last digit has been received, that is the fourth numeric digit, (each time a character is received, the character counter in Register 26 is incremented), that condition is detected inside the PASSADDR routine and one of two branches is made. If bit four of Register 26 was set, it means that the operation in progress was an LDS and so there is a branch to the routine LDS/R that initiates the LDS operation. The subroutine LDS/R causes function code 13 to be initialized in Register R29 for transmission to the Basic Processor and the PC Mode phase sequencer is initialized to the value of hexadecimal F which will cause the function code to be transmitted to the basic processor by the PC routines which will be discussed in detail below. Similarly, if bit four of Register 26 is not set, the function is an LDN, and a branch is made to a routine called MRSY.

Up to this point, the code LDN, LDS or LDT has been detected. In the case of LDT the conditions which initiate the Memory Set function have been established and then execution control is transferred. In the case of LDN and LDS, flags have been set so that an additional four input characters could be accumulated, those being the data specifying the load device address, and those digits have been passed a digit at a time to the accumulation register in the Basic Processor. If the code after receipt of those digits is remembered to be an LDS, a Control P algorithm is initialized which sends the function code over the Basic Processor a little bit later. If the code was an LDN, a branch is made to a microdiagnostic routine which will cause the system microdiagnostics to be executed before the load code is transmitted to the Basic Processor. It is important to note here that the microdiagnostics resets the system and for that reason it would not be possible to initialize the Basic Processor with the load address prior to the execution of microdiagnostics because the data would be cleared out. For that reason it is extremely advantageous to have a holding register where this data can be preserved during microdiagnostic execution.

Entry into load sequence has been from the flag MRSY. There is another entry point just prior to this which is selected in the case of microdiagnostic looping, a function that was described under the MM group of commands. The execution of microdiagnostics is essentially the same. The only difference between microdiagnostic execution under looping microdiagnostic execution during load and microdiagnostic single execution is the way that the address of the device being microdiagnosed is altered in the body of the routine.

The philosophy of microdiagnostic execution in the system is as follows: A processor element in the system is addressed by the SCI over the DCP bus. The processor element address consists of a cluster address (4 bits) and an element address (4 bits). The processor is selected in much the same way as it is selected for display of a Single Clock Status Register, except that instead of Single Clock Status Register Display, a function code is issued after the processor is selected directing the processor to microdiagnose itself. This function code initiates autonomous and asynchronous execution of an internal microdiagnostic routine by the processor.

The SCI determines the success or failure of the microdiagnostic by a single test. It checks to see if, after a period of time, the processor involved has managed to set a flag indicating successful completion of the microdiagnostic routine. Because not all processor locations are populated, and not all processors have microdiagnostics in them, the SCI tests immediately after issuing the microdiagnostic command to see if the processor has in fact altered the microdiagnostic flag to the zero state, to indicate that it has begun microdiagnostics; only if this happens does the SCI subsequently return to see if the microdiagnostics was successful.

In the event that a given processor successfully completes its microdiagnostic, the SCI resets the entire system, modifies the processor address by one, and repeats the process. when it has gone through all processor addresses, it exits to continue the load function which follows naturally and automatically from the microdiagnostic sequence.

If a microdiagnostic fails, an error message is generated by the SCI, and a display of the Single Clock Status Register from that processor is transmitted to the operator.

The first task in the microdiagnostic sequence, (label MRSY) is to reset the system and to delay for a period of 32 microseconds to ensure that that reset has reached all elements of the system. That delay is more than is absolutely necessary, but one characteristic of the design of the external control subsystem is that it is intended to be very tolerant to diversity in the types of subsystems that it supports; and so it provides rather wide margins where feasible.

After the reset delay, a flag is set to indicate that a microtest is in sequence. A test is made to determine whether microdiagnostic looping is to be performed; and in that case the routine branches to a label called TEST, which is the exit point for the microdiagnostic sequence if nothing is to be performed at that moment.

That is a return path to the interrupt detection loop at the beginning of the code. If looping is not the case, the microdiagnostic routine inserts another lengthy delay of 60 milliseconds to permit certain mechanical peripherals to be properly reset and initialized A function of this duration normally would not be possible within the control environment of the SCI because of the interruption to communications sequencing timing. However, during the load sequence it is acceptable to cause this delay because nothing else of a more critical nature is occurring at that time.

Following that delay sequence, the microdiagnostic algorithm proper is entered. At label NXTMICRO a test is made to see if the contents of Register R13, which is the address register for the processor element being microdiagnosed, has reached zero. If it is not zero, a branch is made to label DECRADRS which decrements that address and then moves to connect the processor named by the new address. The select routine, is conventional, and has been described before under the Single Clock Status Register routine. The cluster address is obtained and put on the bus, cluster selection is driven, the element address is obtained and put on the bus and element selection is driven. Following the basic connection, the SCI is set to examine bit O of the Single Clock Status Register of the addressed element.

The microdiagnostic Loop-in-Test sequence flag is cleared; and branches are made based on the various possible looping combinations for microdiagnostics. In the case of microdiagnostic initiation, where a specific processor branch is made to M* and the microdiagnostic code is transmitted over the bus CRLCO7, it is allowed to remain high for 1 microsecond and cleared. If Single Clock microdiagnostics are in progress, however, the code branches to a Clock Z exit where a clock pulse is issued prior to clearing the microdiagnostic signal, allowing the processor element to accept that signal and enter its microdiagnostic sequence during single clocking.

If microdiagnostics have just been initiated, the routine branches to the Test exit which is an entry point for the interrupt detection sequence. A subsequent interrupt will cause a return to the microdiagnostic entry point, and by examining bit 5 of Register R19, a determination will be made that microdiagnostics are in progress and that it is time to determine whether the microdiagnostic was successfully executed. The timing delay between interrupt ticks has thus been used to act as a time-out interval for the microdiagnostic execution in the processor element. Therefore, on the second pass through the end loop routine, a check is made to see whether bit 0 has been reset. If it has been reset to 1, the flags are changed back to initialize the next microdiagnostic test. If the microdiagnostic test has failed, a flag is set in Register R19 to initiate a Single Clock Status Register Display and at the same time Register R16, which is the Fault Status Message Register, is initialized to code F9, which is the indication of a microdiagnostic fault, and then a branch is made to the Z Abort exit which causes all of those things to be displayed.

The process described above it iterated as many times as is required to reduce the processor address register to zero. When that address reaches zero on a pass through the microdiagnostic routine, the Load Function is initialized. The Load Function is established as a code in Buffer R29, (Basic Processor function code 12, or hexidecimal C) and the Basic Processor phase sequencer is set to hexidecimal B which initiates the transfer of the load function following execution of the memory clear function in the processor. This again is done under the PC data transfer routines which will be discussed below.

Once these initializations have been made, of Registers R29 for the function be transmitted to a Basic Processor, and Register R28 for the Basic Processor communications Sequence Phase Counter state, the operation of the load sequences becomes asynchronous with respect to the channel A Input routine and becomes effectively a part of the Channel A Output routine.

The remainder of the ZC Set and Z Parsing routines will be reviewed at the point where a test is made to determine the nature of the code input for a Control Z operation. As noted before the description digressed, the first letter of the code input is not an L so a check is made to see whether the first letter is an R. If the first letter is an R a branch is made to the subroutine RXX and a test is made to see whether the second character is a U. In the event the second characters a U a test is made to see whether the third character is an N. The command is then executed which puts the system in Run. This is done by first modifying flags in the SCI, Register 20, flag 0 and Register R6, flag 6 which indicate a) that PCP Mode is no longer active, and b) that the system is running. A control command CRLC11 is issued which sets the Run latches in the PIC modules associated with each Basic Processor in the system. At that point a branch is made to the Z Exit routine.

If the code is not a RUN, an examination for RSY is made. That being the case a CRLC command 14 is issued which generates the System Reset pulse to all processors and elements of the system. From that a branch is made to the routine CLKZEX1 which causes the SCI to wait for a period of time determined by the numerical contents of Register R13 and then the code falls into Clock Z Exit 2 which actually issues a clock pulse that allows the function to be accepted by the processor elements involved. After that it falls into the normal Z Exit path.

If the function was not an RSY a check is made to see whether it was an RBP, and in that case, a different Basic Processor reset code is issued and again an exit is made to Clock Exit 1. Finally, if it was not one of those, it is determined whether it is an R10. In that case, a third class of reset is issued which is CRLC12 and the code falls into Clock Z Exit 1 again.

To summarize the Reset environment, it will be seen that four different possibilities for reset in the control scheme have been utilized: Superreset, initiated by an MM code to reset the SCI and the control system; RSY which is System Reset that resets all devices in the system, the central processor, the IO processors, the memories, the IO devices on the IO Bus, and everything but the SCI for the purpose of thoroughly initializing the entire computational part of the system; Basic Processor Reset, to reinitialize the Basic Processor alone without disturbing the status or state of the IO system (Basic Processor Reset also has the effect of resetting the memories because it is necessary to reinitialize that interface, but it does not disturb the state of IO controllers on the bus); and IO Reset which does just the opposite, that is, it resets the IO processors and all of their connected IO controllers, but it does not reset the Basic Processor or even alter the point in its instruction sequence where it has been stopped.

The Reset commands are in that class of functions which can only be issued when the system is halted. The exception to this is Superreset which can be issued anytime. There is one modification of this, if the machine is in P Mode, it is effectively halted, even though it is considered from a logical standpoint to be running. The Reset commands can be executed in P Mode even if the machine is ostensibly running.

Returning to the microprogram, if the first character finally turns out not to be an R then it is not an acceptable command in the Z Mode set and a branch is made to a routine called Z Abort which generates an Event Message by initializing the Error Message Register to a given event code and setting a flag which causes the Event Message generator to be executed asynchronously under another routine. Z Abort then falls into the END Sequence Routine. Line 1314 is the normal entry to the Z Exit routine and that sets the END Sequence flag which causes punctuation and graphical control information be sent to the Console device. Z Abort on the next line does essentially the same thing, but it inserts an error message before the line is completed. In either case, the Z sequence is finished by appending a right parenthesis to the line of echoed information, clearing control Z Mode, clearing the various character counters and flags that were set during possible branches of Control Z Mode, and then branching to the entry point of Channel A Out, which is the next major block in the execution sequence of the SCI.

In the Channel A Input routine, one of the exit paths was to the routine SETPC This is done if a Control P character is reveived in an information stream. It puts the system ultimately into the Processor Control mode in which information can be obtained from and information can be sent to the Central Processing Unit in the system. First, a flag is set in the SCI to indicate that PC Mode is true. That flag will remain set until an X character is received signifying the end of Control P Mode. The entire system is then stopped by issuing a CRLC 10 code on the DCP bus and the P Mode Display Mechanism within the SCI is initialized to display the instruction counter of the currently selected Basic Processor. Currently selected means that its address is contained in one of the SCI registers, Register R20, bits 4–7. After reset, the default case for the current selected Basic Processor is Processor O. The task of initializing the display sequence which signifies that the Control P command has been accepted, among other things, is to put a Basic Processor function code in Register R29 of the SCI. The function code here is a binary 1011. Register R28 which is the phase counter and flag register for BP transactions is initialized to show a phase count of one. The PC Mode phase sequencer will be discussed below under Channel A Output. That serves as an asynchronous mechanism for controlling the stepping of the transaction between the Basic Processor and the SCI. Following flag and phase counter initialization, an exit is made to the Channel A Output entry point.

The other and last possible branch out of the Channel A Input routine, as part of the analysis of an incoming character, is to the PCSET. This indicates that the Control P code is already set and the character which has just been received is a Control P command in and of itself. The first thing that happens in PCSET is that flag 5 of Register R28 is cleared. This flag (which can be set by an MM function described above) causes continuous repetition of a given P Mode function. The repetition is ceased by inputting any other character. If the character received is a valid P Mode the repetition will reenabled after the command has been entered into the Basic Processor.

The next step is to put a copy of Register R28, the P Mode phase counter into Register R22, to zero out bits four through seven which aren't relevant to this test and then to compare and see if the remaining value is equal to zero. In the case that the value is not equal to zero, a branch is made to the Channel A Output routine and, effectively, the input character will be ignored. Zero is the quiescent stage of the phase counter for Basic Processor transactions. The purpose of this test is to see if the SCI is in the middle of one of its asynchronous transactions. In normal practice, these transactions complete much faster than communications characters can be received, but if an operator is single clocking through Basic Processor transactions that might not be the case. This is one of several features to prevent the Basic Processor interface from losing synchronization during Single Clocking Mode.

The next step is to take the received character and put it on the output stack for echoing. That is done in the conventional manner. A test is then made to determine if the input character is a hexidecimal digit. In the case that it is a hexadecimal digit, a branch is made to the routine PASSDATA. In the PASSDATA sequence, the BP address stored within the SCI is fetched, placed on the DCP bus to address a cluster, and then the contents of the register containing the translated input character, (in other words the binary equivalent of the ASCII hexadecimal digit) is shifted out to the holding register in the PIC Module associated with the selected Basic Processor. Following that, the DCP bus is disconnected, a test is made to determine if a Load transaction is in progress, and if that is the case a branch is made to return execution to the LDS routine or the LDN initialization sequence as described above.

If the system is in Control P Mode and characters which represent hexadecimal digits are received from the Operator's Console or the controlling device, they are automatically and unquestionably shifted out to the 32 bit storage register associated with the selected Basic Processor. If there are more digits sent out then there are bits in that storage register, then the loading is destroyed. The implementation is transparent to the number of digits input. This is a convenience factor in terms of the Control environment because for an address that is a single digit in the low order position it permits the operator to specify that by typing in a single digit. If the address is 8 digits long he must type in all 8 digits to specify it. The address (or the same register can contain data) is always defined as such only at the time that a function code is entered into the SCI when the machine is in P Mode.

If a P Mode input character it is not a hexadeciaml digit then a check is made to see whether it is a defined function code. If it is not a function code a question mark is echoed to the Console device and exit is made to the Channel A Output routine. But if it is a function code, then a branch is made and several things are done. First of all a check is made of the function code to see if it is an X. Should it be an X, the P Mode flag is cleared and a check is made to see whether the system is supposed to be running. If it is supposed to be running, a code is sent out on the DCP bus to tell all the processors to start running. It is not running, it is allowed to remain in idle. The ENDSEQ flag is set and an exit is made.

If the function was not an X, a branch is made to GOODFN and the Phase Counter is set to transmit that function code to the Basic Processor. The function code that is used by the Phase Sequencer is put in the transfer register then an exit is made to the Channel A Output routine where the transaction is performed. At the same time in GOODFNcontinuous function operations are reenabled which had been disabled at the beginning of the routine.

In review, the Channel A Input functions have for the most part done one of two things: Either they have resulted in a short circumscribed transaction like setting or clearing a flag or driving an interface latch or making a transfer to the TSC, or they have initialized various flags inside the SCI's scratch pad buffer which will be sensed by subsequent routines and initiate sequence actions at the appropriate times. There are three reasons for this way of sequencing things, those are 1 ) time dependence, 2 ) sequential logic dependence and 3) conservation of memory space by sharing of routines. The SCI is time dependent in executing its cycles because it's always racing against the interrupt clock. Likewise, these sequences are logically or functionally sequence-dependent because of the very nature of the transactions — things have to be done in a precise and orderly sequence. An input datum must appear before it can be sent to the device which will receive it, for example. The completion of one transaction has to occur before another transaction can be begun. The flag mechanism is used for deferring events as well as passing them between logically distinct routines.

CHANNEL A OUTPUT

Most of the functions which have to do with the examination of the incoming information were under Channel A Input. Likewise, most of the functions which have to do with the generation of outgoing information are under Channel A Output.

The first part of Channel A Output, is in essence, a mirror image of the input routine in that it uses frame and bit counter registers to determine the timing for signals to be transmitted over the communications interface. A check is made to see if the SCI is in a frame counting sequence. If it is in a frame counting sequence, the frame counter is incremented. A check is made to see if a bit has been completed, if not it branches out. If the bit has been completed, the frame count is reinitialized and another bit is shifted out if another bit exists. (there are some formatting features for handling certain devices, specifically to hold up output transmission of a new character if a device inhibit signal is true.) If a character has just completed transmission, a branch is made to the flag E/CMODE-OUT where the SCI looks to see if there is more data to the output on Channel A.

There are a variety of different sources of output data for Channel A. The first source which the SCI examines is the Output Stack itself. If the Stack has something in it, ascertained by comparing the top and bottom of stack pointers for equality and finding that they are unequal, a test is made of bit 1 of flag Register R19 to check to see if display is permitted. There is an MM function which inhibits display so that the continuous functions can repeat at a more rapid rate. If it is the case that this bit is set, the stack will not be accessed for a new data. Otherwise, assuming there is data on the output stack, which is where all of the input routines put data and where most of the output routines put data, a byte is removed from the bottom of the FIFO stack, and a branch is made to the routine ALDBIT. That routine puts the B Register into Register R5 which is the output register for Channel A, sets the Communication Interface Output Latch to the spacing state to create the start bit of the character, sets the Output Run Flag for Channel A, checks to see if the output character is an EOT as part of a printer protocol, and goes off and inserts the delay if it is. Otherwise, that completes the initialization for output and the routine exits to ECHBOUT.

If there was nothing on the stack available for output, the P Mode Output routine branches instead to the flag E/DISP and searches for some new datum. The typical mode of operation for output display sequences is to let the stack run down to zero, which is detected as the condition when a new event can be initiated, then something which generates data is executed, the stack fills up again, and additional display operations are thereby inhibited until the stack has once again been emptied.

In the E/DISP routine, first a check is made to see if the SCI is in Control Z Mode. If this is the case, any data gathering sequences are aborted because Control Z Mode interrupts the normal flow of these transactions so that it can exercise control. If the SCI is in Control Z Mode, a branch out of this routine is made to Channel B Out and nothing is done. Otherwise, a test is made of Flag zero in Register R18 which is the indication of the End Sequence routine that is used to terminate most display transactions and append certain necessary formatting characters to the end of the display sequences, that is shared by both the Control P and Control Z routines. The purpose of the End Sequence is to insert a carriage return, a line feed, a delaying character, and, in the case of some devices, an End of Transmission character at the end of each line of display output. The exit point from the End Sequence for Control P Mode is to Channel B Output which is where all Channel A Output routines go when they finally exit.

If the End Sequence flag is not set, a test is made to see if Flag 7 of Register R18 is set. That produces a test message called "TXT1" that is displayed following a reset or a restart of the SCI such as when the power is turned on. The message generated in this case may be programmatically determined. The exit from TXT1 is to ECHBOUT The next test under E/DISP, however, is for Flag 5 of Register R18 which goes to the label EVENTGEN and it is in this routine that the alphabetical sequence blank star EVENT blank and a two digit code obtained from Register R16 is displayed in hexadecimal code. This Event code is generated as an error message or as a condition message by various routines in the SCI. To send out an Event flag it is necessary merely to set a Flag 5 of Register R18 and place the desired two digit Event code in Register R16. The exit from EVENTGEN is also to E Channel B Out.

If Flag 5 was not set for Event Generation a test is made of Flag 4 in Register R18 and if that's true, the TXT 2 sequence is entered. This provides a display formatting sequence that clears the screen on keyboard display device used with the system. Again, this is exclusively a formatting sequence. It generates a string of delay characters and then a sequence of characters to erase the screen on the device and then another sequence to place the display cursor in the initialized position. Finally, that branches to the End Sequence routine to generate the end of line text formatting data, and goes to E Channel B Out.

If the flag wasn't set, Register R19 is accessed and Flag 2 of that is checked to determine whether there is a pending request for a Single Clock display. If that is the case, a branch is made to the flag E/SCDISP. This is the sequence that presents the Single Clock Status Register display. In Single Clock Status display, the first step is to deselect all clusters in the system to initialize the interface. The cluster address of the currently selected Single Clock Status Register is then obtained from Register R13 and placed on the bus, a cluster is selected, the element address is obtained from Register R13 and an element is selected.

One of the branches that could have been taken before getting to this point is the End Sequence routine, which would prevent getting into the Single Clock Status Display on this pass. A code routine in the SCI for doing a Single Clock Status Display initializes both the End Sequence routine and the Single Clock Status Display routine so that first of all the End Sequence would be executed and then on a subsequent pass after the stack has emptied itself out again the Single Clock Status Display routine would be entered and the output information would occur at the left hand side of the new line.

During the process of selecting the cluster and element for the Single Clock Status Register the digit which specifies it is translated into ASCII and inserted into the output stack for display to the device. Likewise, a colon is sent out following these two digits as a delimiter before the Single Clock Status information proper is obtained. This two digit plus colon format is meant to be distinctive and to signify the state of the system at that point in time to the operator. It is meant to be a mnemonic aid for the operator to understand the condition of the system at any point in time when the display is taking place. Other displays are formatted in similarly unique and distinctive fashions.

After a cluster has been selected, and an element selected, data is to be taken from the Single Clock Status Register. Register R23 is initialized to all one's which is minus zero in this case and the Single Clock Status display sequence proper commences. That begins by, first of all, initializing the stack pointer for the next input datum and then inputting four bits by successive commands of incrementing Register R23 and shifting from the interface, Register R23 serves as the address register that is transferred to the DCP address register on each cycle. The shift is performed four times. This gets a hexidecimal digit which is then shifted once to the left to align it for translation. It is translated to an ASCII character and placed on the output stack. It is stored indirectly through Register R14 which is the top-of-stack pointer. then, a check is made to see if Register R23 has reached the maximum value 31. If it has not, the cycle is repeated, another four bits are obtained, until, finally, 8 digits of data, 32 bits have been obtained and stacked in the output stack.

The Single Clock Display Flag in Register R19 is cleared, the End Sequence flag is set and additional display characters are inserted in the stack before termination of the sequence. Those consist of, first, a blank to separate the subsequent data from the Single Clock Status Register contents and finally two digits which are the content of the Single Clock counter. This is a counter that is updated each time a clock pulse is generated in any of the single clocking or SCI control clocking modes and Register R31 contains this information. Those two digits are put on the stack and then the display sequence falls into Channel B Output and is terminated.

P- Mode Sequencer

In the parsing routine, under E/DISP, if a Single Clock Status Register display was not called for, then the code unconditionally branches to the flag PHISEL which checks the state of the phase sequencer and serves to advance the phase state of the sequencer if a P Mode phase sequence is active.

It would be noted that each time one of the phase sequencer routines is entered, the SCI executes its task and then advances the phase counter. A branch is made out of the Channel A Output routine and a full interaction of the SCI flow is acccomplished and the SCI does not return here until sometime much later in the processing sequence. Many of these operations put information in the stack so the SCI will spin around through its interrupt routine, perhaps a thousand or more times, extracting those characters out of the stack before a return is made to the phase sequencer again to perform the operations for the next phase step. That is a part of the asynchronism of this operating technique.

The first step in the PHISEL routine is to select the Basic Processor cluster and get it connected to the DCP bus since that will be needed for any subsequent transactions if there are any. The phase counter is obtained from Register R28 and put into Register R22 so that its lower flag bits can be masked off and compared to see if that is zero. In that case, it is in a quiescent condition and a branch is made to the flag PRETO on line 813 which checks the state of the interface between the SCI and the Basic Processor, both of which are now connected to the DCP bus. The signal BP GOTCHA is tested by connecting it to the DCP output line and then testing that line. If that signal is high then a branch is made to the C/GETME routine and the GETME latch is cleared over the DCP bus. This is an initializing function that is important in keeping the Basic Processor in its proper state. The primary function of that portion of code is to keep the system initialized properly during signal clocking transactions and other times when the normal time sequencing of operations is disrupted.

If the GETME flag is not high, then the contents of Register R19 are obtained to get the scan or repetitive clocking flag. This is the code for the continuous display of Single Clock Status Register. It is effectively the last sequence of the output source detection when P Mode is active, being the lowest priority display transaction that can occur during P mode. The purpose of the code is to determine that continuous single clocking is active, if it is scanning a cluster, or just looking at a single register, and based on that information to initialize a new display pass, if no higher priority tasks are outstanding.

In the case that the phase sequencer is not equal to zero, tests are made for its value in the range of one to sixteen to determine the next step in the Basic Processor phase sequence to be performed. Each different phase step involves a different branch to a piece of code which carries on that segement of the BP phase operation.

Phase 1

In the case that the state of the phase counter is one, a branch is made. The Emit 1 Phase 1 function is to transfer an Basic Processor function code from the SCI to the BP to initiate a transaction which involves Basic Processor execution (using its own microcode) to fetch the internal data or perhaps obtain data from the system memory. Under most circumstances, there will be already a datum stored in the 32 bit data register on the PIC associated with the selected BP which will be referenced in the course of this transaction. The Emit 1 function obtains the function code from Register R29, puts it into Register R17 and then falls into the Emit 2 sequence which shifts the function out to a four bit function register on the PIC module associated with the selected Basic Processor. After the function code has been shifted, CRLC is issued which sets the GETME flag to the selected Basic Processor.

All SCI-Basic Processor transactions are asynchronous. The Basic Processor and the SCI are on different clock systems and have fundamentally different rates of instruction execution. All transactions between them are done at "arm's length" by putting information into either the 32 bit data register or the 4 bit function register or both on the PIC module associated with the BP and then setting latches sensible by one or other or both, signifying that a transaction is necessary to operate on the datum.

Setting the GETME flag as part of the Emit 2 sequence serves notice to the Basic Processor that there is a function code for it to process and there may be data ready for it to process on the PIC module. The branch out of this is to the STEPPHI routine which increments the phase counter by one and branches to flag PRET. Flag PRET is in the code which checks to see if there are any Single Clock Displays required. In the case that a P Mode transaction is taking place, the display of additional Single Clock Status Register information during the display will be aborted unless it is specifically requested through a Z Mode command.

Phase 2

If at the time of entry to the phase frequency routine, Phase 2 is set, (logically follows from the processing of Phase 1 on an earlier pass) a branch is made to the flag S/ENSEQ which arms the End Sequencer that provides carriage return line feed information as described above, and then branches to the STEPPHI routine which is the exit point. When a P Mode control command is received it causes the Phase Sequence Counter to step from 0 to 1 and Phase 1 causes the command to be sent to the Basic Processor. It steps to Phase 2 and that merely formats the output display so the cursor of the display device is moved to the beginning of the next line where the actual information display will be put.

Phase 3

A test is made for Phase 3. If this is the case, a branch is made to a routine called BP/PROMPT appearing on line 20. This routine also does formatting. It places on the output stack the address, that is the 1-digit number describing the selected basic processor, (in a monoprocessor system that will always be 0), and puts a colon after that in the display line. This is another nmemonic display format created for operator recognition. The BP/PROMPT routine then exists through the STEPPHI routine as we have seen before.

Phase 4

If the SCI is in Phase 4, which means all of the formatting has been done, the branch is to routine called T/GOTCHA. After a function code has been sent to the Basic Processor, some response is expected from it. The availability of the response is signified by the setting of a latch called GOTCHA. The DCP is already connected to the Basic Processor by virtue of the entry into the Phase selection routine. The T/GOTCHA routine tests the interface signal GOTCHA by connecting that to DCPDO and in the case that the GOTCHA is not true, exits to the PRET sequence discussed above. If GOTCHA is true, that means that there is data ready for the SCI over in the PIC register in the PIC module associated with the BP. So, a counter is initialized to minus 32 and the GETME latch is cleared, the waiting for GOTCHA flag is cleared, the DCPDI bus is cleared to avoid interference with data there, and a sequence is entered to shift in 8 digits of 4 bit binary data from the interface on the PIC. This is not a Single Clock Status Register, it behaves somewhat differently it responds to different shifting code — and so requires a separate shift loop. The shifting operation is self evident. The effect of this transaction is that the SCI shifts in a chunk of 4 bits, translates it into an ASCII digit and puts it on the output stack, then goes and gets another 4 bits — and continues for 8 characters. Finally, after the 8th character it steps the Phase Counter by 1 and branches to Channel B Output. The stack is now full of data.

Phase 5

In Phase 5 in the phase detection loop, the branch is to a label called WAIT. Here the SCI checks to see if the GOTCHA signal is still high. In the protocol between the SCI and the Basic Processor when the SCI clears the GETME flag (and when the BP's GOTCHA signal is true) then the Basic Processor must clear the GOTCHA signal. If single clocking is in process the BP may not be able to do this for some period of time, so here the WAIT routine just waits and doesn't allow the SCI to do any other logical transactions with the Basic Processor until it has gone ahead and cleared the interface signal signifying that it is ready to proceed to another step. Normally the GOTCHA flag has been cleared well before the SCI looks to see if it is clear. In the case that it has been cleared, this routine sets the function code to 15, the function code that will be next transmitted to the Basic Processor, and increments the phase counter by 1 more, getting it to Phase 6.

Phase 6

When the phase is 6, the phase sequencer branches to the routine PUNCT and inserts some more punctuation on the output stack, specifically a blank and a sign and another blank. This prefaces the display of the address proper. Then the phase counter is incremented by falling into the STEPPHI routine and that goes to its natural exit from the Channel A Output sequence.

Function code 15 tells the Basic Processor to display the current value of the address that it has stored in it which is has obtained from the SCI in prior transactions. This address is in fact the address of the datum which it did access as a result of the function code in the transaction just preceeding. The purpose of displaying the address is for operator clarity and also as a reliability feature determining that the interfaces are operating properly.

Phase 7

Phase 7 causes a branch to the Emit 2 sequence (which is a sub-component of the Emit 1 sequence discussed before) that sends the BP function code 15 out to the PIC and sets the GETME latch, telling the Basic Processor to now go and get the address of the datum it has just displayed and put that into the data interface register. Then the phase sequencer steps once more to Phase 8

Phases 8 and 9

Phase 8 tests for the GOTCHA signal. Phase 9 branches to the WAIT routine which waits to insure that the GOTCHA signal has gone low before performing another operation.

Phase 10 branches to the routine WHAT NEXT which checks to see whether to proceed with another P Mode operation or do something else. The first test is to see if P Looping is armed. If that is the case, then there is a branch to the routine P Loop Armed, PLPARMED, which checks to see if P Looping is active. If P Looping is both armed and active, then a branch is made to the label PLPING and the phase counter is set to 0 and then a branch is made to the STEPPHI exit point which will cause the phase counter to be initialized to 1 again, which will subsequently cause a repetition of the P Mode display sequence when the stack gets flushed and the phase sequencer is next called upon.

Phase 11

Now if P Looping is not armed or is not active, a branch is made to STEPPHI and we go from Phase 10 to PHase 11. The detection of Phase 11 causes a branch to the Set End Sequence routine which, as noted before, provides punctuation and formatting of the display and causes the phase counter to be stepped again. The Phase 11 condition when detected causes a branch to the routine 2BLANK which puts two blanks on the end of the display line by stacking them and then branches to the sequence ZEROPHI which clears the phase counter and branches to Channel B Output. The two blanks serve as a spacer to separate the display from new commands which may be entered on the same line.

Phases 1—12 are the normal execution sequence for manually and/or automatically initiated P Mode transactions,

Phase 13

Phase 13 is initiated by receipt of an LDN command in Control Z mode. That branches to Emit 1 and sends out through Emit 1 a function code that initiates the load sequence on a subsequent path following the advancement of the phase counter to 14.

Phase 14

In Phase 14 the phase sequencer directs execution to the subroutine S/RUN which tests for GOTCHA in the same manner as the WAIT routine and exits if GOTCHA is still high. When it sees GOTCHA low, it sets the system Run bit true, clears PCP mode, and starts the system running which initiates actual load execution. Then it zeros out the phase counter. The Basic Processor that has been loaded will start up with the load bootstrap and then proceed running. Then it exits to Channel B Out.

Phase 15 is entered in the event of the LDS command. It causes execution of the Emit 1 sequence without the initialization orRun sequences. Phase 15 gets the load function out to the Basic Processor, but it does not start the machine running. Then Emit 1 naturally sets the phase to zero and the SCI and the Basic Processor return to a stable and quiescent state which is (with the BP ready to run and the SCI ready to accept the commands). That completes the list of Output Phase Sequencer states which control the P Mode transaction.

For the sake of the clarity, the P Mode transfer mechanism will be examined again looking at the different ways that information is exchanged between the SCI and the Basic Processor.

The first class of events is the transfer of numerical hexadecimal digits in binary from the SCI to the shift register on the PIC module, this occurs when in Control P Mode, and can go on indefinitely without causing any other event. If a character that is received is a hexadecimal digit and if the SCI is in the proper state it will shift that out to the interface.

The second class of event is transfer of a BP function code from the SCI to the Basic Processor. This serves to notify the Basic Processor that it must perform a sequence of some sort. In Appendix C is a table of the function codes recognized from translation of alphabetic characters manually input by the operator. A few of those are originated by routines within the SCI and cause control sequences that are typically part of a larger pattern of sequence operation. The functions that the BP can perform are as follows:

| Code Val. Function | Operator Input |
|---|---|
| 00 SELECT PCP ADDRESS (MEMORY) | (/) |
| 01 SELECT PCP ADDRESS (Q) | (.) |
| 02 DISPLAY ADDRESSED LOCATION DATA | (RUB) |
| 03 INCREMENT PCP ADDRESS | (I) |
| 04 SHIFT DISPLAY 1 BIT LEFT | (L) |
| 05 SHIFT DISPLAY 1 BIT RIGHT | (R) |
| 06 STORE IN ADDRESSED LOCATION | (M) |
| 07 ADD TO ADDRESSED LOCATION | (+) |
| 08 SUBTRACT FROM ADDRESSED LOCATION | (−) |
| 09 SINGLE STEP FROM PSQ | (S) |
| 10 SINGLE STEP FROM Q5 | (G) |
| 11 DISPLAY NEXT INSTRUCTION | (U) |
| 12 LOAD & EXECUTE FROM DIAGNOSTIC AND LOADER | ZC(LDN A###) |
| 13 LOAD ONLY LOADER | ZC(LDS a####) |
| 14 MEMORY SET (ALL LOCATIONS EQUAL TO THE CONTENTS OF QX'IA') | ZC(LPT) |
| 15 DISPLAY CURRENT PCP ADDRESS *BIT) OF THE RETURNED 32-BIT VALUE IS *0 FOR MEMORY ADDRESSING *1 FOR Q ADDRESSING *THE SECOND HEX OF THE RETURNED 32-BIT VALUE CONTAINS THE CONDITION CODES FOR A STEP OPERATION | |

The general classes of function are: (1) Selecting an address, either in the Main Memory or in the Basic Processor's Two-register; (2) Displaying data as a function of that address; (3) Modifying that address by incrementing it; (4) Modifying the apparent display by shifting it one bit to the left or one bit to the right, (this is a function that is used to justify data as a convenience to the operator, since the only display mode implemented is hexidecimal output).

One problem which programmers and operators encounter is the need occasionally to shift a binary datum one bit left or right for address justification purposes, and in hexidecimal this is a rather demanding intellectual exercise, so the purpose of shifting the information in the PCP before it is converted to hexadecimal is to simplify that task.

It is also possible to modify locations in Memory through the P Mode command. A value can be added to an address location, subtracted from the address location or that location can be replaced entirely with any value.

Another type of P Mode operation is stepping the Basic Processor. There are two kinds of single stepping initiated by the SCI generated functions. Single stepping from the program status quadruple word as had been done with prior computer systems from a panel switch, or a single step from a specific register that causes an instruction to be executed without modifying the contents of the program counter.

There is a function for displaying the next instruction, displaying the current PCP address, and there are three Load related functions; Load with diagnostic execution, Load only the loader, and Memory Set which is used during the LDN sequence as the memory Clear to initialize the entire Main Memory of the system to a given value. When it is used as Memory Clear the value is zero.

These functions are transferred from the SCI to the Basic Processor by putting the data into the four bit function register and then setting the GETME latch in the PIC. The BP senses this if its clocks are running or after its clocks have run through N many steps, and shifts in first of all the contents of the four bit function register then if the function is one which involves a data component, the BP shifts in the 32 bits of the data register which, depending upon the command, will be used as an address or as a data value. The BP then performs the requisite operation, based on this data, and produces a result typically, in the form of a 32 bit result value which it shifts back into the PIC display register. The BP then relinquishes control of the PIC by raising the GOTCHA latch. The SCI by calling up the PIC over the DCP bus and issuing the right CRLC command can sense the condition of the GOTCHA latch and, finding that in the high state, obtains data, if that is an appropriate step, or at least proceeds to the next sequence step. The SCI always checks to see that the Basic Processor has lowered its GOTCHA latch before initiating another sequence that would involve raising GETME since that is necessary for separation on one command response from the next All of these transactions are performed in an asynchronous manner, over a reasonably long span of time in terms of computer speed. For the SCI to do a single Basic Processor display it passes through its interrupt routine (based on the 10 character per second speed) perhaps 12,000 times in the course of executing a single Basic Processor data display. The structure of interlocking flags prevents the SCI from ever getting ahead of or failling behind the Basic Processor despite the disparity in their speeds.

TSC DATA OUTPUT

If it turns out that there is no data forthcoming from P Mode, the one remaining alternative as a data source for Channel A Output is the TSC, in other words, software data output. In the C/GETME sequence, if other conditions are unfulfilled, and the machine is not in P Mode, and not in Z Mode, and it does not have any continuous operations going on, a branch is made to the routine E/CHA/TSCO, and there a check is made to see whether the SCI is in Transparent Text Mode. If so, a branch out is made without doing anything. If the machine is in PCP Mode, a branch out is made without doing anything. And if an MM1 or an MM2 is in execution, a branch out is made without doing anything.

However, if none of those qualifying cases are true, and an output is required, Register R22 is initialized to the code for Channel A Output data collection and a branch is made to the routine E/TSCO which is the TSC transfer routine. The TSC Output routine functions in a manner similar to the TSC Input routine.

TSC COMMUNICATIONS OUTPUT ROUTINE

If the Channel A Output routine is not able to find information in any of the Control P or Control Z sequence modes, it accesses the TSC Communication Output routine to determine whether a character is available from the software generated data stream coming over the MIOP through the TSC. Entry point for this is line at the label ETSCO.

The transaction has several parts to it. First of all the SCI takes control of the DCP bus and clears any outstanding conditions on it, then it shifts out to the TSC the contents of the SCI Register R22 which is a transfer code comprehensible to the TSC, designating whether the transfer is input or output and whether it is for Channel A or B. After shifting that code into the TSC, bit by bit, the SCI sets an attention flip-flop which has the effect of interrupting the micro-sequence in the TSC, and leaves that high for a period of one microsecond. Then the SCI waits for a period of nine microseconds by looping on a single instruction and shifts in eight data bits and one data valid bit. Finally, it disconnects the TSC and checks the data valid bit to see if actual information has been transmitted in the transaction.

In the case that real data has not been received, the routine exits from the TSC portion and from what ever portion called it previously, (in this case the Channel A Output Routine), and branches into the SCP display handler. In the case that a valid bit has been received, a check is is made to determine if it is an EOT character which may relate to operation of a special printer device. If so, an interface flag is set. If the entry was from the Channel A routine, a branch is made back to Channel A where the output initialization is resumed Channel A TSC return, which was discussed earlier; or if the entry has been from the Channel B Output routine, the Channel B Transmit frame and bit counters are initialized and the Channel B interface flags are initialized for the commencement of transmission in the same way as Channel A (above).

A test is also made for the case that Channel A equals Channel B, one of the switch setable configuration options, in which case the Channel A character is simultaneously initiated for both Channel A and Channel B. Finally, at the end of the TSC Output routine is the Channel B Output frame counter, which is really a continuation of the Channel B Output routine, and which is so closely related to the TSC handling routine that the two are essentially merged together.

The Channel B Output frame counter sequence is comparable to the other output framing sequence described earlier for Channel A, with the only exception being that Channel B is normally run as a free-standing independent channel and therefore, is not involved in the intricate parsing and text analysis procedures applied to Channel A.

The general algorithm for accessing information from the TSC on output is interesting in that it is designed for full asynchronism between the SCI and the TSC, yet allows control of the process timing and the overall transaction to remain with the SCI. That is accomplished by the method of first transmitting a character which specifies the type of transaction to be performed and setting an alarm signal in the TSC and then waiting a specified interval, during which data will either be made available or will not be made available depending upon chance and the condition under which TSC happens to be operating at the time. If TSC is busy or if there is no data available for output or if the TSC is not initialized for output, the net effect of the transaction will be to produce no data on the output interface and initialize no new character. The process of requesting new data will be reinitiated whenever the SCI gets back down to the same point in the Channel A Output routine or the Channel B Output routine where it needs new data.

If data is available, however, the presumption of this transfer scheme is that, for the data valid bit to be set, the information transmitted just prior to receipt of the data valid bit must represent a full datum for output. Any errors or aberrations detected in that character subsequent to receipt from the TSC can be considered hardware or functional errors in the system. This method of partitioning both simplifies the manner of asynchronism between the devices and also testing of the interfaces between SCI and TSC.

Both the Channel A Output and Channel B Output routines eventually branch to the SCP Display Handler when they have finished their respective tasks. The function of the Display Handler is to access the control circuitry of the computer display panel, determine the address of a datum which is desired to be displayed, obtain that datum through the Single Clock Status Register mechanism and transfer it to the SCP panel.

SCP DISPLAY HANDLER

Because the SCP Display Handler falls rather late in the overall time sequencing of and because it is not specially there — critical the SCI, the first event of this routine is to test and see if the interrupt latch signifying a new clock time frame has been set. Should this be the case, the SCP handler is not executed but control returns to the beginning of the overall SCI sequence at the E Channel B entry point. Should time be available CRLC codes are sent to first connect the SCP; secondly, to cause the SCP to jam its next desired Single Clock Status Register address value into its own shift register; and third to disable all other clusters which may be on the DCP bus. Then the 8-bit address value of the Single Clock Status Register designated by the SCP is shifted into the SCI and converted into two parallel half-bytes which are used in the conventional manner to address a cluster and an element in the DCP network. The SCI then initializes its own bit counter to 32 and at the same time, or roughly concurrently, through the use of CRLC codes disconnects the SCP shift register output from the DCP bus and connects the SCP shift register input to the DCP bus and connects the SCP shift register input to the DCP bus. The SCP then issues a CRLC code which starts the shift register of the SCP (the 32-bit shift register, which is really the display buffer for the SCP) shifting, and one clock time later it starts its own internal address bit counter counting down. Both processes continue until a count of 32 has been achieved and all bits of the distant Single Clock Status Register have been transferred directly to the SCP Display Buffer Register. Then with a CRLC 63 the SCI disconnects the SCP from the DCP bus allowing it to stabilize its display buffer and falls into the E microsequence routine.

The microdiagnostic and micro-sequencing routines have been discussed at some length previously and will not be repeated in detail here. The normal exit from the microdiagnostic routine when entered from the SCP routine is to go to the Test function which is at the very beginning of the overall code sequence just after the Initializer and Tick routine. These test routines are one of the general purpose functions of the SCI within the framework of the computer system. Their purpose is to detect certain fundamental error conditions signalled by one or more of the Basic Processors in the system and to initiate control events which will rectify or signal those conditions.

TEST SEQUENCES

The idea of the test sequences in general is that there are certain error detect mechanisms which can be armed or disarmed depending upon the requirements of operation for the system. When they are armed it is by means of setting bits in the so called Processor Control Word which is resident in (one of the Q-scratch pad registers of the Basic Processor). When any of these conditions should produce a result in the form of an altered condition, it will cause the setting of a bit in the Basic Processor Single Clock Status Register. The function of the test routines is to examine the Single Clock Status Register for the Basic Processor that is selected and in some cases to initiate system actions when these bits occur.

ADDRESS MATCH

The first function that is tested for is the presence of Address Match, which is connected to the DCP bus by means of the CRL code CRLC 48. The Address Match mechanism in the system is comparable in function to that which has existed in previous processors, but its implementation is substantially different, in that the address generation mechanism in the system is more widely distributed than has been hereto experienced. In earlier processors, the complete memory address is generated within the Basic Processor unit itself. In the instant system the address generated by the Basic Processor contains indirect and indexing information and, in the case of special modes, base register information, but it does not include mapping which is done by the MI Processor unit.

Because the determination of the actual address sent to memory is an important criterion in addressing matching it is therefore necessary to make the address match comparison occur in the MI proper. There is in the Basic Processor a register reserved for the Address Match word, which specifies both the type of address matching to be performed, literal or virtual, page or word, read/write, etc. and also carrier the value of the address components that is to be matched against. The Basic Processor automatically transfers this datum up to the MI unit whenever it is altered in the BP's Q-scratch pad.

In the Basic Processor Processor Control Word, there are some control bits to enable and disable Address Matching and other control bits to enable and disable the Address Match Alarm function. When an Address Match occurs in the MI a signal is sent down to the Basic Processor, and depending upon the condition of the Address Match hold bit in the Basic Processor Processor Control Word, the Basic Processor may or may not at that time cease execution at the instruction boundary or at that access point. The point of this SCI function is to determine if a Basic Processor has in fact stopped itself because of an Address Match condition and under that circumstance to notify the operator that his machine is no longer running.

ADDRESS ALARM

This function, is a feature which provides a higher level of subjective feel to an operator in controlling a computer system without being able to see an array of display lamps. The idea of the Address Match Alarm is that, with the proper conditions enabled, whenever a predetermined address condition occurs or a given location is accessed, in the course of execution, the Address Match latch will be set in the Basic Processor and sometime later — within two hundred microseconds or so, the SCI will sense the setting of that latch and turn on an audible alarm. The intended function of this is to produce an audible signal which varies as a function of the frequency of execution of a given location in memory, which can be used to test the relative balance of time between one mode of processing and another, for example, or the relative frequency of occurence of a certain class of error.

Following Test for Address Matching, a CRLC command is issued to connect the Basic Processor's Error Halt latch to the DCP bus. If this signal is true, it indicates that the Basic Processor has stopped itself because of an error condition. The SCP updates its own status, should this be the case, to indicate that this system is halted (that will in turn generate a display of a message stating that the system is halted), and then branches, based on the setting of SCI maintenance flags, to a function called Reset Run. If Ad-Match was true, the alarm latch is set, if it was not true, the alarm latch is cleared and then a branch is made to the test point TSTHLT, where, by issuing a CRLC command the Ad-Match latch is cleared, if it was set, and the Error Halt latch is connected to the DCP bus. Then a test is made to see if Error Halt is true, and if so a branch is made to obtain the contents of Register R18. R18 holds flags for these functions, and a check is made to see the status of Event Message Display. Bit 5 of Register R18 is examined to see whether the Event Message Display flag is already set.

Because of the nature of the test that is performed here it is possible to generate error conditions much more rapidly than the console device can display the error information. By making this test an error condition is intentionally ignored or action on an error condition is ignored if it turns out that the SCI is still trying to respond to a previous error condition. Should that display bit be set a branch is made to the E Tick routine.

If the display bit is not set, a check is made of Bit 3 of flag Register R18 to determine whether a halt message can or should be generated to the operator as a result of this condition. If that test is not successful, a CRLC 02 command is issued to clear the error halt condition and a branch is made back to the E Tick routine, leaving things where they were.

HALT MESSAGE

If that flag is set, saying that a halt message can be issued a branch is made to, HLTMSG and, first of all, bit 3 of Register R18 is disabled which is the bit that controls generation of a halt message. Then the address of the currently selected Basic Processor is obtained and selected. The low order 3 bits of the Basic Processor Single Clock Status Register are shifted in through conventional SCSR shifting methods and a display message is created in the event flag buffer which contains two hexadecimal digits which are printed out to indicate an error attention or fault condition in the machine and bits 28, 29 and 30 of the Basic Processor Single Clock Status Register give combinations FO through F7 of these fault condition possibilities. Those are merged into the Event Display register, Flags 1 and 5 of Register R18 are set to initiate the event display and then a test is made to see if the machine is in maintenance mode.

If not in maintenance mode at this point, a branch is made back to the E Tick routine and processing is continued having made a message to be displayed. If in maintenance mode, a branch is made to the routine RUNRST which checks to see if the system is in run with an error condition existing. Should this be the case, a routine is entered where the main system is reset for a period of 20 microseconds or more and bit 2 of register R18 is set which is the restart flag that will cause the machine to be restarted on the next pass through this routine if the error halt condition is no longer true. And then an exit is made to E Tick.

On the next pass through this routine which will presumably occur after the next E Tick Sequence, the condition is encountered where the Error Halt latch is not true and the flags indicate that the "rerun" sequence is initiated, or is waiting to proceed. A check is made to see if the message has been completed. If the previously displayed message has already been completed, a new error message is generated saying the system has been restarted and then the system is restarted, the Run flag set, the rerun flag cleared and normal operation is resumed.

While the invention has been described with reference to a preferred embodiment, to those skilled in the art will occur modifications and variations of the invention which remain, however within the scope of the claims appended hereto.

APPENDIX A

| CRLC CODES | |
|---|---|
| 00 | CLEAR GETME |
| 01 | CLOCK IN ELEMENT ADDRESS |
| 02 | CLEAR ERRORHALT |
| 04 | START SHIFTING FCN REG |
| 05 | SET GETME |
| 06 | CONNECT BPGOTCHA |
| 07 | START TEST |
| 08 | CLUSTER SELECT |
| 09 | DESELECT CLUSTER |
| 10 | HALT SYSTEM |
| 11 | RUN THE SYSTEM |
| 12 | I/O RESET |

APPENDIX A-continued

| CRLC CODES | |
|---|---|
| 13 | BASIC PROCESSOR RESET |
| 14 | RESET |
| 15 | CONNECT ERRORHALT AND CLEAR ADMATCH |
| 16 | CONTROL ZCI |
| 17 | CLEAR OLD SSW VALUE |
| 18 | SENSE, SENSE SWITCH 1 |
| 19 | SENSE, SENSE SWITCH 2 |
| 20 | SENSE, SENSE SWITCH 3 |
| 21 | SENSE, SENSE SWITCH 4 |
| 22 | GENERATE POWERTRAP SIGNAL |
| 24 | RESERT AND DISCONNECT TSC |
| 25 | START TSC SHIFTING |
| 26 | STOP SHIFTING, SET ATTN FLIPFLOP IN TSC |
| 29 | RESET ATTN FLIPFLOP |
| 32 | CONNECT SCP |
| 33 | DISCONNECT SCP OUTPUT |
| 34 | JAM SWITCHES |
| 35 | START SCP SHIFTING |
| 48 | CONNECT ADMATCH TO DCPD$\phi$ |
| 63 | RELEASE/QUIESCE~. |

What is claimed is:

1. A data processing system having a plurality of devices including a basic processor, memory unit and I/O processor, said devices interconnected to one another by a first group of data and address lines comprising a first electrical bus, the data processing system further comprising:
    a. at least one operator console,
    b. a controller connected to said operator console, said controller including a microprogrammed processor comprising:
        1. a control memory for storing a programmed sequence diagnostic control words,
        2. means for addressing said control memory,
        3. an arithmetic and logic unit for processing said control words, and
        4. addressing means connected to said arithmetic and logic unit for generating an address,
    c. a second group of data and address lines comprising a second electrical bus, said second bus independent of said first bus for carrying diagnostic control signals associated with said diagnostic control words, said second bus connected to said controller,
    d. one of said plurality of devices comprising:
        1. diagnosing means for conducting diagnostic tests thereon, and
        2. means responsive to said address generated by said addressing means;
    e. said diagnosing means comprising storage means for storing procedures of said diagnostic test therein,
    f. said diagnosing means initiated by a signal of said controller on said second bus and conducting said diagnostic test independently of said controller,
    g. said diagnosing means providing an indication of successful completion of said diagnostic test on said second bus to said controller.

2. A data processing system as recited in claim 1 wherein said one of said plurality of devices and said controller operate asynchronously of each other.

3. A data processing system as recited in claim 1 wherein said diagnosing means comprises means for setting a flag to a first condition during execution of said diagnostic test and means for setting said flag to a second condition only after successful completion of said diagnostic test.

4. A data processing system as recited in claim 3 wherein said flag comprises a bit in a single clock status register, and wherein said second condition of said flag indicates successful completion of said diagnostic test to said controller.

5. A data processing system as recited in claim 4 wherein said first condition of said flag indicates to said controller correspondence between said one of said plurality of devices and said address.

6. A data processing system as recited in claim 1 wherein said controller further comprises means for ascertaining whether said address corresponds to an address of said one of said plurality of devices.

7. A data processing system as recited in claim 6 wherein:
 a. said diagnosing means comprises:
  1. means for setting a flag to a first condition during execution of said diagnostic test, and
  2. means for setting said flag to a second condition only after completion of said diagnostic test, and
 b. said ascertaining means comprises means responsive to said flag being set to said first condition.

8. A data processing system as recited in claim 1 wherein:
 a. said addressing means generates an address at a first time and at a second, later time,
 b. said address responsive means responds to said address at a first time for enabling said diagnosing means to be initiated by said controller, and
 c. said diagnosing means of said one of said plurality of devices provides said indication of successful completion on said second bus to said controller in response to said address at said second, later time.

* * * * *